US012493249B2

(12) United States Patent
Fujisaki et al.

(10) Patent No.: US 12,493,249 B2
(45) Date of Patent: Dec. 9, 2025

(54) ELECTROSTATIC CHARGE IMAGE DEVELOPING TONER, PRODUCTION METHOD OF SAME, AND ELECTROPHOTOGRAPHIC IMAGE FORMING METHOD

(71) Applicant: Konica Minolta, Inc., Tokyo (JP)

(72) Inventors: Tatsuya Fujisaki, Hino (JP); Junya Onishi, Hachioji (JP); Kaori Fujino, Hino (JP); Kazumi Oura, Sagamihara (JP)

(73) Assignee: KONICA MINOLTA, INC., Tokyo (JP)

( * ) Notice: Subject to any disclaimer, the term of this patent is extended or adjusted under 35 U.S.C. 154(b) by 800 days.

(21) Appl. No.: 17/829,965

(22) Filed: Jun. 1, 2022

(65) Prior Publication Data

US 2023/0022529 A1 Jan. 26, 2023

(30) Foreign Application Priority Data

Jun. 11, 2021 (JP) ................................ 2021-097733

(51) Int. Cl.

| | |
|---|---|
| ***G03G 9/087*** | (2006.01) |
| ***G03G 9/08*** | (2006.01) |
| ***G03G 9/097*** | (2006.01) |
| ***G03G 15/08*** | (2006.01) |

(52) U.S. Cl.

CPC ....... *G03G 9/08711* (2013.01); *G03G 9/0804* (2013.01); *G03G 9/09733* (2013.01); *G03G 15/08* (2013.01)

(58) Field of Classification Search

CPC .......... G03G 9/08708; G03G 9/08755; G03G 9/08782; G03G 9/08795

See application file for complete search history.

(56) References Cited

FOREIGN PATENT DOCUMENTS

| | | | | |
|---|---|---|---|---|
| JP | H08-044110 | * | 2/1996 | .............. G03G 9/08 |
| JP | H08-44110 A | | 2/1996 | |
| JP | H10-073956 | * | 3/1998 | .............. G03G 9/08 |
| JP | H10-73956 A | | 3/1998 | |
| JP | 2003-005441 A | | 1/2003 | |

(Continued)

OTHER PUBLICATIONS

Translation of H08-044110.*

(Continued)

*Primary Examiner* — Peter L Vajda

(74) *Attorney, Agent, or Firm* — LUCAS & MERCANTI, LLP

(57) ABSTRACT

Provided is an electrostatic charge image developing toner including toner base particles containing a binder resin an a mold release agent, wherein a molecular weight corresponding to a main peak top of a molecular weight distribution curve of constituent components of the electrostatic charge image developing toner obtained by gel permeation chromatography is 15,000 or more; and in comparison of an area ratio of each peak in the molecular weight distribution curve, the binder resin contains an amorphous material of a low molecular weight component having a weight average molecular weight of 300 or more and less than 1000 in the area ratio of 10 to 20% with respect to the total amount of the binder resin.

6 Claims, 4 Drawing Sheets

(56) References Cited

FOREIGN PATENT DOCUMENTS

| | | | |
|---|---|---|---|
| JP | 2014-174262 | A | 9/2014 |
| JP | 2015-121661 | A | 7/2015 |

OTHER PUBLICATIONS

Translation of H10-073956.*
Office Action issued for the related Japanese patent application No. 2021-097733, mailed on Jan. 14, 2025, with its machine English translation, 12 pages.

* cited by examiner

ELECTROSTATIC CHARGE IMAGE DEVELOPING TONER, PRODUCTION METHOD OF SAME, AND ELECTROPHOTOGRAPHIC IMAGE FORMING METHOD

CROSS-REFERENCE TO RELATED APPLICATIONS

The entire disclosure of Japanese Patent Application No. 2021-097733 filed on Jun. 11, 2021 is incorporated herein by reference in its entirety.

BACKGROUND

Technological Field

The present invention relates to an electrostatic charge image developing toner, a method for producing the same, and an electrophotographic image forming method. More specifically, the present invention relates to an electrostatic charge image developing toner, which has excellent low-temperature fixability, prevent tacking, and suppress glossiness of a fixed image.

Description of the Related Art

In recent years, due to the market demand for high-speed and energy-saving image forming apparatus, an electrostatic charge image developing toner (hereinafter, also simply referred to as a "toner") that has excellent low-temperature fixability and can provide a high-quality image has been sought. For the toner, lowering the melting temperature and melting viscosity of the binder resin enables low-temperature fixing, while the wax contained in the toner tends to bleed out onto the image. There was a problem that the glossiness of the image became too high beyond the desired range.

For example, Patent Document 1 (JP-A 2014-174262) discloses a method of using a polyester resin that has sharp-melt property as a toner binder resin, or a crystalline resin that has a property of rapidly softening at the melting point from the crystallized state and ensures heat-resistant storage below the melting point. However, when pursuing low-temperature fixability, there was a problem that the fixed image became highly glossy due to the rapid decrease in the melt viscosity of the toner.

Further, Patent Document 2 (JP-A 2015-121661) discloses that a toner having a core-shell structure composed of a core portion containing a first polyester resin and a shell layer containing a second polyester resin having a high content of a metaphenylene skeleton has sufficient low-temperature fixability and excellent heat resistance, and it is possible to form a fixed image with low and suppressed glossiness. However, since the toner described in Patent Document 2 provides a low-gloss image, it is necessary to change the toner when a high-gloss image is desired.

In addition, as described above, there is a problem that tacking occurs in the paper ejection tray of the image forming apparatus when low-temperature fixing is achieved by lowering the melting temperature and melting viscosity of the binder resin, especially by using a crystalline substance.

SUMMARY

The present invention has been made in view of the above problems and situations. The problem to be solved thereof is to provide an electrostatic charge image developing toner, which has excellent low-temperature fixing property, may prevent tacking, and may suppress glossiness of a fixed image, and to provide a production method of the toner and the electrophotographic image forming method.

As a result of examining the cause of the above problem, the present inventor has investigated the cause of the above problem in order to solve the above problem, and has found that the above problems is solved by the following means, and have reached the present invention. That is, by controlling the molecular weight corresponding to the main peak top of the molecular weight distribution curve of the constituent components of the electrostatic charge image developing toner and the area ratio of the peak of the amorphous material of the low molecular weight component in the molecular weight distribution curve within a certain range, the above-mentioned problem according to the present invention is solved.

To achieve at least one of the above-mentioned objects of the present invention, an electrostatic charge image developing toner that reflects an aspect of the present invention is as follows.

An electrostatic charge image developing toner comprising toner base particles containing at least a binder resin an a mold release agent, wherein a molecular weight corresponding to a main peak top of a molecular weight distribution curve of constituent components of the electrostatic charge image developing toner obtained by gel permeation chromatography is 15,000 or more; and in comparison of an area ratio of each peak in the molecular weight distribution curve, the binder resin contains an amorphous material of a low molecular weight component having a weight average molecular weight of 300 or more and less than 1000 in the area ratio of 10 to 20% with respect to the total amount of the binder resin.

According to the above means of the present invention, it is possible to provide a toner for developing electrostatic charge image, a method for producing the same, and a method for forming an electrophotographic image, which are excellent in low-temperature fixability, may prevent tacking, and may suppress glossiness of a fixed image. The expression mechanism or action mechanism of the effect of the present invention has not been clarified, but it is inferred as follows.

When the molecular weight of the constituent components of the electrostatic charge image developing toner becomes large, it is considered that the decrease in the melt viscosity of the binder resin may be suppressed by the heat at the time of image fixing, and the fixed image becomes not smooth and has low gloss. Therefore, in the present invention, the molecular weight corresponding to the main peak top of the molecular weight distribution curve of the constituent components of the electrostatic charge image developing toner obtained by gel permeation chromatography is set to 15,000 or more, thereby the fixed image has low gloss. In addition, when the low molecular weight component is amorphous, it may suppress tacking. By adding an amorphous material of a low molecular weight having an average molecular weight of 300 or more and less than 1000 to the electrostatic charge image developing toner in the area ratio of 10 to 20% with respect to the total amount of the binder resin, in comparison of the area ratio of each peak in the molecular weight distribution curve, it is possible to improve the sharp-melt property of the toner.

BRIEF DESCRIPTION OF THE DRAWINGS

The advantages and features provided by one or more embodiments of the invention will become more fully understood from the detailed description given hereinbelow and the appended drawing which are given by way of illustration only, and thus are not intended as a definition of the limits of the present invention.

DETAILED DESCRIPTION OF THE EMBODIMENTS

Figure 1:
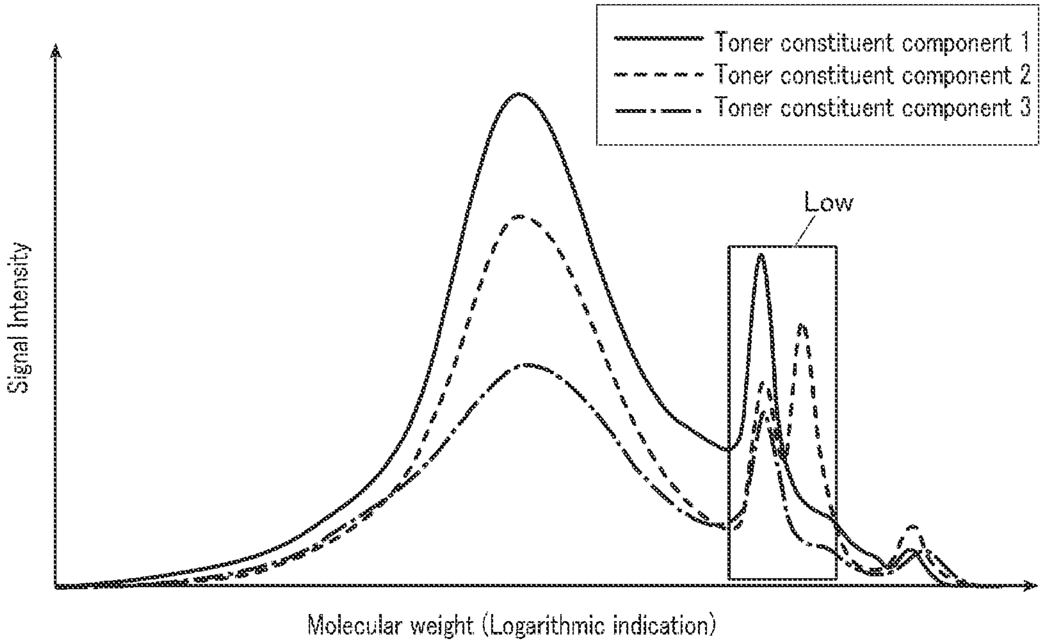
FIG. 1 is a schematic diagram showing the relationship between a molecular weight distribution curve and a peak.

Hereinafter, one or more embodiments of the present invention will be described. However, the scope of the invention is not limited to the disclosed embodiments.

The electrostatic charge image developing toner of the present invention is an electrostatic charge image developing toner comprising toner base particles containing at least a binder resin and a mold release agent, wherein a molecular weight corresponding to a main peak top of a molecular weight distribution curve of constituent components of the electrostatic charge image developing toner obtained by gel permeation chromatography is 15,000 or more; and in comparison of an area ratio of each peak in the molecular weight distribution curve, the binder resin contains an amorphous material of a low molecular weight component having a weight average molecular weight of 300 or more and less than 1000 in the area ratio of 10 to 20% with respect to the total amount of the binder resin.

This feature is a technical feature common to or corresponding to each of the following embodiments.

As an embodiment of the present invention, it is preferable that the binder resin contains a styrene-acrylic resin from the viewpoints of balance of thermal characteristics, bleed-out of a mold release agent, and compatibility with additives.

It is preferable that the mold release agent is an ester wax from the viewpoint of improving the sharp-melt property of the toner.

It is preferable that the content ratio of the mold release agent to the amorphous material of the low molecular weight component is in the range of 0.5 to 0.7 in order to achieve both image glossiness and low-temperature fixability.

It is preferable to produce the toner base particles by an emulsion aggregation method having at least an aging step from the viewpoint of uniformity of particle size, controllability of shape, and ease of core-shell and domain-matrix structure formation.

It is preferable to carry out the aging step within the range of −5 to 15° C. of the melting point of the mold release agent from the viewpoint of suppressing the glossiness and ensuring the releasing property from the fixing belt.

The electrostatic charge image developing toner of the present invention is suitably used for an electrophotographic image forming method (hereinafter also referred to as an "image forming method").

Hereinafter, the present invention, its constituent elements, and modes and embodiments for carrying out the present invention will be described in detail. In the present application, the term "to" is used to mean that the numerical values described before and after the term "to" are included as the lower limit value and the upper limit value.

[Outline of Electrostatic Charge Image Developing Toner]

The electrostatic charge image developing toner of the present invention (hereinafter simply referred to as a "toner") is an electrostatic charge image developing toner comprising toner base particles containing at least a binder resin and a mold release agent, wherein the molecular weight corresponding to the main peak top of the molecular weight distribution curve of the constituent components of the electrostatic charge image developing toner, obtained by gel permeation chromatography, is 15,000 or more, and in comparison of an area ratio of each peak in the molecular weight distribution curve, the binder resin contains an amorphous material of a low molecular weight component having a weight average molecular weight of 300 or more and less than 1000 in an area ratio of 10 to 20% with respect to the total amount of the binder resin.

(Main Peak Top)

In the present specification, the "main peak" means a peak having the maximum area ratio, preferably the peak with an area ratio of 50% or more among the peaks of the molecular weight distribution curve of the constituent components of the electrostatic charge image developing toner obtained by gel permeation chromatography (hereinafter, also referred to as "GPC") (see FIG. 1). The "main peak top" means a point where the coordinate value on the vertical axis is the largest value, that is, the maximum value in the main peak of the molecular weight distribution curve. The term "peak" means "the portion protruding from the baseline" and refers to the point in the molecular weight distribution curve at which the peak reaches its maximum. In the present invention, an area having an area of 3% or more of the total peak area of the molecular weight distribution curve obtained by the above GPC measurement is defined as a "peak".

(Calculation Method of Molecular Weight)

The molecular weight corresponding to the main peak top of the molecular weight distribution curve of the constituent components of the electrostatic charge image developing toner is calculated from the integral molecular weight distribution curve by GPC. It can be calculated by the molecular weight in polystyrene equivalent by GPC.

Further, the content ratio of the low molecular weight component amorphous material having a weight average molecular weight of 300 or more and less than 1000 to the total amount of the binder resin may also be calculated by the same method as described above. In the molecular weight distribution curve, it appears as a shoulder of a main peak or a sub-peak (see FIG. 1).

For example, when the peak top appears in the part described as "Low" in FIG. 1 may be judged that the product contains a low molecular weight component having a weight average molecular weight of 300 or more and less than 1000.

A "sub-peak" refers to a peak other than the main peak in the molecular weight distribution curve.

(Molecular Weight Distribution Curve Obtained by GPC)

In the present invention, the molecular weight distribution curve measured by GPC of the constituent components of the electrostatic charge image developing toner is obtained as follows.

All the constituent components of the electrostatic charge image developing toner are added to tetrahydrofuran (THF) so as to have a concentration of 1 mg/mL, and the mixture is dispersed at 40° C. for 15 minutes using an ultrasonic disperser. A sample solution is prepared by treating with a membrane filter having a pore size of 0.2 μm.

Using a GPC device HLC-8220GPC (manufactured by Tosoh Corporation) and columns "TSK guardcolumn+TSK gel Super HZM-M triple" (manufactured by Tosoh Corporation), tetrahydrofuran is flowed as a carrier solvent at a flow rate of 0.2 mL/min while maintaining the column temperature at 40° C.

10 μL of the prepared sample solution is injected into the GPC device together with the carrier solvent, the sample is detected using a refractometer (RI detector), and the calibration line measured using monodisperse polystyrene standard particles is used. The molecular weight distribution of the sample is calculated. The calibration curves is prepared by measuring 10 points of polystyrene standard particles (manufactured by Pressure Chemical). The used polystyrene standard particles have a molecular weight of $6\times10^2$, $2.1\times10^3$, $4\times10^3$, $1.75\times10^4$, $5.1\times10^4$, $1.1\times10^5$, $3.9\times10^5$, and $8.6\times10^5$, $2\times10^6$, and $4.48\times10^6$ respectively.

When the above filter-induced peak is identified in the data analysis, the region before the peak was set as the baseline.

The molecular weight distribution curve is obtained as described above, with the molecular weight on the X-axis (logarithmic indication) and the signal intensity on the Y-axis (the sum of the peak areas is 1) (See FIG. 1).

In the molecular weight distribution curve, the peak areas in each molecular weight range indicate the mass fraction.

(Amorphous Material)

Examples of the amorphous material according to the present invention include amorphous resins, thermoplastic elastomers and low molecular weight natural rubbers, including additives of different composition from the main resin.

The binder resin according to the present invention contains an amorphous material of a low molecular weight component having a weight average molecular weight of 300 or more and less than 1000. The amorphous material is contained in the range of an area ratio of 10 to 20% with respect to the total amount of the binder resin in comparison with the area ratio of each peak in the molecular weight distribution curve.

When the above range is less than 10%, low-temperature fixability may not be ensured, and when it is larger than 30%, high glossiness of the image may not be suppressed.

1. Toner Base Particles

In addition to the binder resin and the mold release agent, the toner base particles according to the present invention may contain other components such as other colorants, charge control agents and external additives.

In the present invention, "toner particles" refers to toner base particles to which an external additive is added, and an aggregate of toner particles is called a "toner.

Generally, the toner base particles may be used as they are as toner particles, but in the present invention, the toner base particles to which an external additive is added are used as the toner particles.

In the following description, toner base particles and toner particles are also simply referred to as "toner particles" when there is no need to distinguish between them. The following is a detailed description of each constituent material of the toner base particles of the present invention.

(1.1) Binder Resin

A binder resin (also referred to as a "binding resin") refers to a resin used as a medium or a matrix (base) for dispersing and holding the internal additives (waxes, charge control agents, and pigments) and external additives (silica and titanium dioxide) contained in toner particles. The binder resin has a function of bonding to a recording medium (e.g. paper) during the toner image fixing process.

The electrostatic charge image developing toner of the present invention is an electrostatic charge image developing toner comprising toner base particles containing at least a binder resin and a mold release agent, and it is characterized by the fact that the molecular weight corresponding to the main peak top of the molecular weight distribution curve of the constituent components of the electrostatic charge image developing toner obtained by gel permeation chromatography is 15,000 or more.

The main peak described above is derived from the binder resin, and in the present invention, it is preferable to contain at least an amorphous resin.

As the amorphous resin, it is preferable to contain a styrene-acrylic resin from the viewpoint of thermal characteristics, bleed out of the mold release agent, and compatibility with additives.

When the binder resin is styrene-acrylic resin and the mold release agent is an ester compound, the compatibility of the three, including the amorphous material of the low molecular weight component, is well balanced, making it easier to achieve low-temperature fixability, tacking suppression, and low glossiness.

In the toner of the present invention, conventionally known binder resins, such as amorphous resins and crystalline resins, may be applied as a binder resin.

(1.1.1) Amorphous Resin

The amorphous resin according to the present invention is a resin having no crystallinity, which will be described later. For example, the amorphous resin is a resin that does not have a melting point and has a relatively high glass transition temperature (Tg) when differential scanning calorimetry (DSC) of the amorphous resin or the toner particles is performed.

The Tg of the above amorphous resin is preferably in the range of 35 to 80° C., particularly preferably in the range of 45 to 65° C.

The glass transition temperature may be measured according to the method (DSC method) specified in ASTM (American Society for Testing and Materials) D3418-82.

For the measurement, a differential scanning calorimeter DSC-7 (manufactured by PerkinElmer, Inc.), a thermal analyzer controller TAC7/DX (manufactured by PerkinElmer, Inc.), may be used.

The amorphous resin may be one type or more. Examples of the amorphous resin include a vinyl resin, a urethane resin, a urea resin and amorphous polyester resins such as a styrene-acrylic modified polyester.

In the present invention, the amorphous resin preferably contains a vinyl resin as a main component of the binder resin, and preferably also contains an amorphous polyester resin, from the viewpoint of easily controlling the thermoplasticity.

The electrostatic charge image developing toner of the present invention is characterized in that the molecular weight corresponding to the main peak top of the molecular weight distribution curve of its constitute components is 15,000 or more, and when an amorphous resin is used as the amorphous material of the low molecular weight component, the weight average molecular weight of the amorphous resin is 300 or more and less than 1000.

The number average molecular weight (Mn) of the amorphous resin as the main resin is preferably in the range of 5,000 to 150,000, and more preferably it is in the range of 8,000 to 70,000.

The molecular weight of amorphous resins may be measured in the same way as the molecular weight distribution method described above.

(Vinyl Resin)

The above vinyl resins are, for example, polymers of vinyl compounds, examples of which include an acrylic ester resin, a styrene-acrylic ester resin, and an ethylene-vinyl acetate resin. Among them, a styrene-acrylic ester resin (styrene-acrylic resin) is preferred from the viewpoint of plasticity during heat fixing.

<<Styrene-Acrylic Resin>>

A styrene-acrylic resin is formed by addition polymerization of at least a styrene monomer and a (meth)acrylic ester monomer. Examples of the styrene monomer include, in addition to styrene represented by the structural formula of $CH_2{=}CH{-}C_6H_5$, styrene derivatives having a known side chain or functional group in the styrene structure.

Examples of the (meth)acrylic ester monomer include an acrylic ester and a methacrylic ester represented by known as $CH(R_1){=}CHCOOR_2$ ($R_1$ represents a hydrogen atom or a methyl group, and $R_2$ represents an alkyl group of 1 to 24 carbon atoms), as well as an acrylic ester derivative and a methacrylic ester derivative having a known side chain or a functional group in the structure of these esters.

Examples of the styrene monomer include styrene, o-methylstyrene, m-methylstyrene, p-methylstyrene, α-methylstyrene, p-phenylstyrene, p-ethylstyrene, 2,4-dimethylstyrene, p-tert-butylstyrene, p-n-hexylstyrene, p-n-octylstyrene, p-n-nonylstyrene, p-n-decylstyrene and p-n-dodecylstyrene.

Examples of the (meth)acrylic ester monomer include acrylic ester monomers such as methyl acrylate, ethyl acrylate, isopropyl acrylate, n-butyl acrylate, t-butyl acrylate, isobutyl acrylate, n-octyl acrylate, 2-ethylhexyl acrylate (2EHA), stearyl acrylate, lauryl acrylate and phenyl acrylate; methacrylic ester monomers such as methyl methacrylate, ethyl methacrylate, n-butyl methacrylate, and isopropyl methacrylate, isobutyl methacrylate, t-butyl methacrylate, n-octyl methacrylate, 2-ethylhexyl methacrylate, stearyl methacrylate, lauryl methacrylate, phenyl methacrylate, diethylaminoethyl methacrylate, and dimethylaminoethyl methacrylate.

In this specification, "(meth)acrylic ester monomer" is a generic term for "acrylic ester monomer" and "methacrylic ester monomer" and means one or both of them. For example, "methyl(methyl)acrylate" means one or both of "methyl acrylate" and "methyl methacrylate".

The above (meth)acrylic ester monomer may be one type or more. It is possible to form any one of the following: forming a copolymer using a styrene monomer and two or more kinds of acrylic acid ester monomers; forming a copolymer using a styrene monomer and two or more kinds of methacrylic acid ester monomers; and forming a copolymer by using a styrene monomer, an acrylic acid ester monomer and a methacrylic acid ester monomer in combination.

The above amorphous resin may further contain a structural unit derived from a monomer other than the styrene monomer and the (meth)acrylic acid ester monomer.

<<Others>>

The other monomer is preferably a compound that forms an ester bond with a hydroxy group (—OH) derived from a polyhydric alcohol or a carboxy group (—COOH) derived from a polyvalent carboxylic acid. In other words, the amorphous resin is preferably a polymer that is addition polymerizable to the above styrene monomer and (meth)acrylic ester monomer and further polymerized with a compound having a carboxy or a hydroxy group (amphoteric compound).

Examples of the above amphoteric compound include compounds having a carboxy group such as acrylic acid, methacrylic acid, maleic acid, itaconic acid, cinnamic acid, fumaric acid, maleic acid monoalkyl ester, and itaconic acid monoalkyl ester; compounds having a hydroxy group such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meta)acrylate, and polyethylene glycol mono(meth)acrylate.

The above styrene-acrylic resins may be synthesized by polymerizing monomers using known oil-soluble or water-soluble polymerization initiators. Examples of the oil-soluble polymerization initiator include azo or diazo polymerization initiators, and peroxide polymerization initiators.

Examples of the azo or diazo polymerization initiator include 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile and azobisisobutyronitrile.

Examples of the peroxide polymerization initiator include benzoyl peroxide, methyl ethyl ketone peroxide, diisopropyl peroxycarbonate, cumene hydroperoxide, t-butyl hydroperoxide, di-t-butyl peroxide, dicumyl peroxide, 2,4-dichlorobenzoyl peroxide, 2,4-dichlorobenzoyl peroxide, 2,4-dichlorobenzoyl peroxide, lauroyl peroxide, 2,2-bis-(4,4-t-butylperoxycyclohexyl)propane and tris-(t-butylperoxy)triazine.

When styrene-acrylic resin particles are synthesized by emulsion polymerization, a water-soluble radical polymerization initiator may be used as a polymerization initiator. Examples of the water-soluble polymerization initiator include persulfates such as potassium persulfate and ammonium persulfate, azobisaminodipropane acetate, azobiscyanovaleric acid and its salts, and hydrogen peroxide.

When an amorphous resin is used as the amorphous material contained in the electrostatic charge image developing toner of the present invention, the weight average molecular weight (Mw) of the amorphous resin is set to 300 or more and less than 1000, thereby, it is possible to achieve both low-temperature fixability and low glossiness of the amorphous resin. The above Mw may be obtained from the molecular weight distribution measured by gel permeation chromatography (GPC).

(Amorphous Polyester Resin)

It is preferable to use an amorphous polyester resin for the shell when the toner base particles have a core-shell structure, because it has excellent heat resistance without interfering with fixability. An amorphous polyester resin is a polyester resin that do not have a melting point and have a relatively high glass transition temperature (Tg) when subjected to differential scanning calorimetry (DSC). Further, since the monomer constituting the amorphous polyester resin is different from the monomer constituting the crystalline polyester resin, it may be distinguished from the crystalline polyester resin by analysis such as NMR.

The amorphous polyester resin is obtained by polycondensation reactions of a divalent or more carboxylic acid (polyvalent carboxylic acids) with a divalent or more alcohol (polyhydric alcohol). There are no restrictions on specific amorphous polyester resins, and conventionally known amorphous polyester resins in the art may be used.

The specific method for producing the amorphous polyester resin is not particularly limited, and the amorphous polyester resin is produced by polycondensation (esterification) of a polyvalent carboxylic acid and a polyhydric alcohol by using a known esterification catalyst.

The catalysts that may be used in the production, the temperature of polycondensation (esterification), and the time of polycondensation (esterification) are not particularly limited, and they are the same as for the crystalline polyester resins below.

(1.1.2) Crystalline Resin

In the present invention, the crystalline resin refers to a resin having a clear endothermic peak instead of a stepped endothermic change in differential scanning calorimetry (DSC). A clear endothermic peak specifically means a peak in which the half width of the endothermic peak is within 15° C. when measured at a temperature rise rate of 10° C./min in differential scanning calorimetry (DSC).

The toner base particles of the present invention may contain a crystalline resin as a binder resin. The content of the crystalline resin in the toner base particles is preferably in the range of 1 to 40 mass % from the viewpoint of obtaining sufficient low-temperature fixability, and more preferably, it is in the range of 7 to 15 mass %.

When the content is 1 mass % or more, sufficient plasticizing effect is obtained and low-temperature fixability is sufficient. Further, when the content is 20 mass % or less, the thermal stability as a toner and the stability against physical stress are sufficient.

The crystalline resin is not particularly limited, and examples thereof include a polyolefin resin, a polydiene resin, and a polyester resin. Among these, a crystalline polyester resin is preferable from the viewpoint of obtaining sufficient low-temperature fixability and gloss uniformity, and ease of use.

The number average molecular weight (Mn) of the crystalline resin is preferably in the range of 2,500 to 5,000, and more preferably in the range of 3,000 to 4,500. From the viewpoint of low-temperature fixability and gloss stability, the number average molecular weight (Mn) of the crystalline resin is preferably in the range of 3,000 to 12,500, and more preferably in the range of 4,000 to 11,000. The weight average molecular weight (Mw) of the crystalline resin is preferably in the range of 10,000 to 100,000, more preferably in the range of 15,000 to 80,000, and still more preferably in the range of 20,000 to 50,000.

When Mw and Mn are within the above range, it is easy to achieve a balance between fixability and heat resistance. Further, sufficient strength is obtained in the fixed image. In addition, during toner production, the crystalline resin is not pulverized during emulsion agitation, and the glass transition temperature Tg of the toner is kept constant, thus maintaining the thermal stability of the toner. Mw and Mn may be determined from the molecular weight distribution measured by gel permeation chromatography (GPC) as described above.

(Crystalline Polyester Resin)

The crystalline polyester resin is obtained by polycondensation reactions of a divalent or more carboxylic acids (polyvalent carboxylic acids) with a divalent or more alcohol (polyhydric alcohol).

<<Polyvalent Carboxylic Acid>>

Examples of the polyvalent carboxylic acid include dicarboxylic acids. These dicarboxylic acids may be one type or more. Preferably it is an aliphatic dicarboxylic acids, and may further include an aromatic dicarboxylic acid. The aliphatic dicarboxylic acid is preferably linear, from the viewpoint of enhancing the crystallinity of the crystalline polyester.

Examples of the aliphatic dicarboxylic acid include oxalic acid, malonic acid, succinic acid, glutaric acid, adipic acid, pimelic acid, suberic acid, azelaic acid, sebacic acid, 1,9-nonanedicarboxylic acid, 1,10-decanedicarboxylic acid, 1,11-undecanedicarboxylic acid, 1,11-undecanedicarboxylic acid, 1,12-dodecanedicarboxylic acid (dodecanedioic acid), 1,13-tridecanedicarboxylic acid, and 1,14-tetradecanedicarboxylic acid, 1,16-hexadecanedicarboxylic acid, 1,18-octadecanedicarboxylic acid, their lower alkyl esters, and their acid anhydrides.

Examples of the aromatic dicarboxylic acid include terephthalic acid, isophthalic acid, orthophthalic acid, t-butylisophthalic acid, 2,6-naphthalenedicarboxylic acid and 4,4'-biphenyldicarboxylic acid.

<<Polyhydric Alcohol>>

Examples of the polyhydric alcohol component include diols. The diols may be one type or more, preferably it is an aliphatic diol, and may further contain other diols. The aliphatic diol is preferably a linear type from the viewpoint of enhancing the crystallinity of the crystalline polyester.

Examples of the aliphatic diol include ethylene glycol, 1,3-propanediol, 1,4-butanediol 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol 1,14-tetradecanediol, 1,18-octadecanediol and 1,20-eicosanediol.

Examples of the other diol include diols having a double bond and diols having a sulfonic acid group. Specific examples of the diol having a double bond include 2-butene-1,4-diol, 3-hexene-1,6-diol and 4-octene-1,8-diol.

The content of the constituent unit derived from the aliphatic diol with respect to the constituent unit derived from the diol in the crystalline polyester resin is 50 mol % or more from the viewpoint of enhancing the low-temperature fixability of the toner and the glossiness of the finally formed image. It is more preferably 70 mol % or more, still more preferably 80 mol % or more, and particularly preferably 100 mol %.

The ratio of the above diol to the above dicarboxylic acid in the monomer of crystalline polyester resin is the ratio of the hydroxy group [OH] of the diol to the carboxy group [OH] of the dicarboxylic acid. It is preferable that the equivalent ratio of [OH]/[COOH] is in the range of 2.0/1.0 to 1.0/2.0, more preferably in the range of 1.5/1.0 to 1.0/1.5, and still more preferably in the range of 1.3/1.0 to 1.0/1.3.

<<Others>>

It is preferable that the monomer constituting the crystalline polyester resin contain more than 50 mass % of linear aliphatic monomer, and it is more preferable that it contains more than 80 mass %. When an aromatic monomers is used, the melting point of the crystalline polyester resin tends to be higher, and when a branched aliphatic monomer is used, the crystallinity tends to be lower. Therefore, it is preferable to use linear aliphatic monomers for the above monomer.

From the viewpoint of maintaining the crystallinity of the crystalline polyester resin in the toner, it is preferable to use 50 mass % or more of the linear aliphatic monomer, and it is more preferable to use 80 mass % or more.

The crystalline polyester resin may be synthesized by polycondensation (esterification) of the above polyvalent carboxylic acid and polyhydric alcohol using known esterification catalysts.

The catalysts that may be used in the synthesis of crystalline polyester resins may be one type or more, examples thereof include alkali metal compounds such as sodium and lithium; compounds containing group II elements such as magnesium and calcium; metal compounds such as aluminum, zinc, manganese, antimony, titanium, tin, zirconium, and germanium; phosphite compounds; phosphoric acid compounds; and amine compounds.

The polymerization temperature of the crystalline polyester resin is preferably in the range of 150 to 250° C. The polymerization time is preferably in the range of 0.5 to 10 hours. During polymerization, the reaction system may be depressurized if necessary.

The crystalline resin according to the present invention may be one type or two types.

(1.2) Toner Base Particles Having a Core-Shell Structure

The electrostatic charge image developing toner according to the present invention may be toner base particles having a core-shell structure. Here, the "core-shell structure" refers to a form in which a resin forming a shell layer is aggregated and fused on the surface of the core particles.

The toner base particles are preferably core-shell particles in which the crystalline material and the amorphous resin are used for core particles, and the amorphous polyester resin or the hybrid amorphous polyester resin in which the vinyl polymer segment and the polyester polymer segment are bonded is arranged on the core particles as a shell layer.

The vinyl polymer segment means a portion derived from the vinyl resin. In other words, it means a molecular chain with the same chemical structure as the molecular chain that constitutes the vinyl resin. The polyester polymer segment means a portion derived from the polyester resin. In other words, it means a molecular chain with the same chemical structure as the molecular chain that constitutes the polyester resin.

The shell layer does not have to cover the entire surface of the core particles and may partially expose the core particles. The cross-section of the core-shell structure may be confirmed by a known observation means such as a transmission electron microscope (TEM) and a scanning probe microscope (SPM).

In the case of a core-shell structure, the glass transition point, melting point, hardness, and other properties may be different for the core particles and the shell layer, enabling the design of toner particles according to the purpose. For example, it is preferable to form a shell layer by aggregating and fusing a resin with a relatively high glass transition point (Tg) onto the surface of the core particles that contain a binder resin, colorant, and mold release agent, and have a relatively low glass transition point (Tg).

The method for producing toner particles with a core-shell structure may be referred to the description in the JP-A 2016-161780. Toner particles with a core-shell structure by the emulsion aggregation method are obtained as follows. First, the binder resin fine particles for the core particles, the crystalline substance, and the colorant are aggregated (and fused) to prepare the core particles. Next, the binder resin fine particles for the shell portion are added to the dispersion liquid of the core particles, and the binder resin fine particles for the shell portion are aggregated and fused to the surface of the core particles to form a shell portion that covers the surface of the core particles.

(1.3) Toner Base Particles Having a Domain-Matrix Structure

The electrostatic charge image developing toner according to the present invention may be toner base particles having a domain-matrix structure.

Here, a "domain-matrix structure" is also called a "sea-island structure" and refers to a structure in which an island-like dispersed phase (domain) having a closed interface (boundary between phases) exists in a continuous phase (matrix: corresponding to the sea) of toner base particles.

In the toner base particles having a domain-matrix structure of the present invention, an amorphous polyester resin or a hybrid amorphous polyester resin is introduced incompatibly in the amorphous resin. The domains may contain a lamellar crystal structure. This structure may be observed by the following. It is also preferable that a wax that is a mold release agent is added in addition to the resin in the domain or in the matrix.

Apparatus: Electron microscope "JSM-7401F" (JEOL Ltd.)

Sample: Sections of toner particles stained with ruthenium tetroxide ($RuO_4$) (section thickness: 60 to 100 nm)

Accelerating voltage: 30 kV

Magnification: 50,000 times

Observation conditions: Transmission electron detector, bright field image

When the electrostatic charge image developing toner according to the present invention has a domain-matrix structure, the average diameter of the domains is preferably in the range of 50 to 150 nm. The average diameter of the domains stained by the method described above is determined using electron microscopy and image processing analysis equipment (e.g., LUZEX™ AP", manufactured by Nireco Inc.). The mean diameter of the domain here refers to the mean value of the long diameter of the domain (1.4) Mold Release Agent It is preferable that the content ratio of the mold release agent to the amorphous material of the low molecular weight component of the present invention is in the range of 0.5 to 0.7 in order to achieve both image glossiness and low-temperature fixability.

It is especially preferable that the content ratio of the mold release agent to the amorphous material of the above low molecular weight component is 0.7 or less from the viewpoint of image glossiness. Further, when the addition amount ratio of the mold release agent is 0.5 or more, it is particularly preferable from the viewpoint of mold release properties. For example, separation from the fixing belt during the image forming process is good, and fixing performance is not deteriorated.

The mold release agent applicable to the toner base particles according to the present invention is not particularly limited. For example, various known waxes may be used, but an ester wax is preferred from the viewpoint of improving the sharp-melt property of the toner.

(Sharp-Melt Property)

In the present specification, the "toner sharp-melt property" means, for example, the state in which the difference between the melting start temperature and the melting end temperature in the DSC curve measured at a constant temperature increase rate in differential scanning calorimetry is small. It indicates the state in which the peak of the DSC curve is sharp. Otherwise, in the dynamic viscoelasticity measurement of toner, when the temperature change of viscoelasticity (for example, complex viscosity) is observed at a constant temperature rise rate, it represents the degree of change of viscoelasticity (for example, complex viscosity) with respect to the temperature change. The greater the degree of change in viscoelasticity (complex viscosity) with respect to temperature changes, the greater the sharp-melt property of the toner. In addition, the greater the sharp-melt property of the toner, the higher its sensitivity to heat and the lower the fixing temperature.

Figure 2:
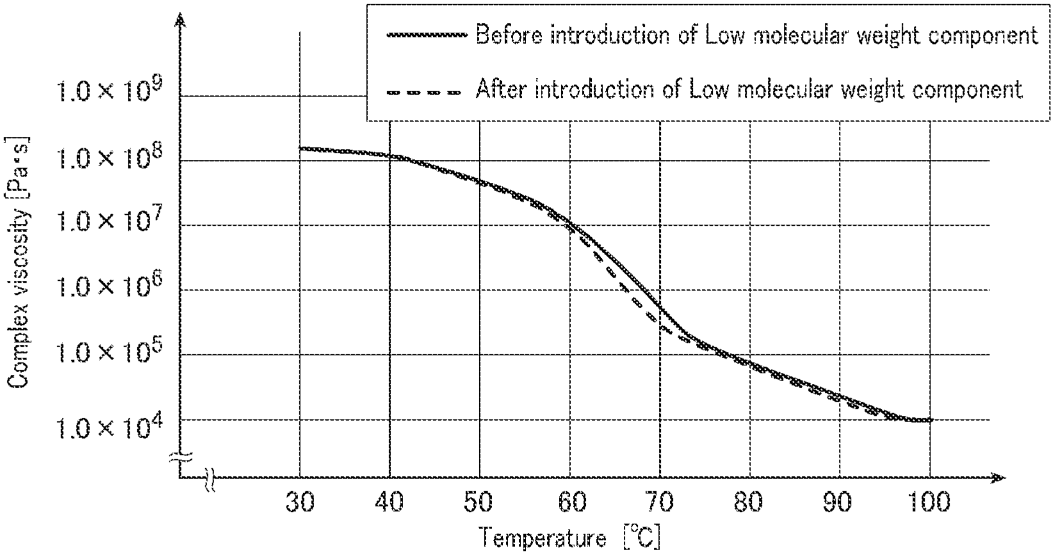
FIG. 2 is a schematic diagram for understanding the improvement of the sharp-melt property of the toner.

A schematic diagram for understanding the improved sharp-melt property of the toner in the present invention is shown in FIG. 2. FIG. 2 is a graph with the temperature of the toner on the horizontal axis and the complex viscosity of the toner on the vertical axis. As for the method for measuring the dynamic viscoelasticity, it is preferable to use the methods and measurement conditions generally used conventionally for the toner, and it is preferable to measure the toner by, for example, the following method.

(Measuring Method)

As a measurement sample, a certain amount (for example, 0.2 g) of toner to which an external additive is arbitrarily added to the toner base particles is weighed, and a constant pressure (for example, 25 MPa) is applied by a compression molding machine to perform pressure molding. A pellet having a certain shape (for example, a columnar shape having a diameter of 10 mm) made of the above toner is prepared.

Next, using a rheometer (for example, ARES G2 manufactured by TA instrument), a parallel plate with a constant diameter (for example, 8 mm) is used on the top, and a parallel plate with a constant diameter (for example, 20 mm) is used on the bottom, and a constant frequency is used. The temperature rise is measured under the condition of (for example, 1 Hz).

Then, the sample is set at a constant temperature (for example, 100° C.), the distance between the plates (gap) is once set to 1.4 mm, and then the sample protruding from the plates is scraped off.

After that, the distance between the plates is set to a certain distance (for example, 1.2 mm), the temperature is lowered to the measurement start temperature (for example, 30° C.) while applying the axial force, and the axial force is stopped. The complex viscosity is measured at a constant temperature rise rate (for example, 3° C./min) from the measurement start temperature (30° C.) to a constant temperature (for example, 190° C.).

As can be seen from FIG. 2, when comparing before and after the introduction of the low molecular weight component into the toner, for example, when focusing on the complex viscosity 1.0x106 [Pa·s], it can be seen that even with the same complex viscosity, the temperature of the toner is low, and the slope (rate of change) of the change in the complex viscosity with respect to the temperature change at 60 to 70° C. is large. Therefore, from the above, it can be seen that the sharp-melt property is improved by introducing a low molecular weight component into the toner.

Examples of Ester Wax

Examples of the ester wax include Carnauba wax, Montan wax, behenic behenate, trimethylolpropane tribehenate, pentaerythritol tetrabehenate, pentaerythritol diacetate dibehenate, glycerin tribehenate, 1,18-octadecanediol distearate, tristearyl trimellitate, and distearyl maleate.

(Melting Point)

The melting point of the mold release agent is preferably in the range of 60 to 90° C. This ensures a balance between thermal storage resistance and fixability, as well as productivity of the toner.

(1.5) Colorant

In the toner base particles according to the present invention, a dye and a pigment generally known as a colorant may be combined and used as a colorant.

The colorant according to the present invention may be one type or more. Examples of typical colorants include colorants for magenta, yellow, cyan, and black.

Examples of the colorant for magenta include C.I. Pigment Red 2, 3, 5, 6, 7, 15, 16, 48:1, 53:1, 57:1, 60, 63, 64, 68, 81, 83, 87, 88, 89, 90, 112, 114, 122, 123, 139, 144, 149, 150, 163, 166, 170, 177, 178, 184, 202, 206, 207, 209, 222, 238 and 269.

Examples of the colorant for yellow include C.I. Pigment Orange 31, 43, and 44, Pigment Yellow 12, 14, 15, 17, 74, 83, 93, 94, 138, 155, 162, 180 and 185.

Examples of the colorant for cyan include C.I. Pigment Blue 2, 3, 15, 15:2, 15:3, 15:4, 16, 17, 60, 62, and 66 and C.I. Pigment Green 7.

Examples of the colorant for black include carbon black and magnetic particles. Examples of the carbon black include channel black, furnace black, acetylene black, thermal black and lamp black. Examples of the magnetic material for magnetic particles include ferromagnetic metals such as iron, nickel, and cobalt; alloys containing these metals, compounds of ferromagnetic metals such as ferrite and magnetite; chromium dioxide; and alloys that do not contain ferromagnetic metals but exhibit ferromagnetic properties when heat treated. Examples of the alloy that exhibits ferromagnetism upon heat treatment include Hensler alloys such as manganese-copper-aluminum and manganese-copper-tin.

The content of the above colorant in the above toner base particles may be determined appropriately and independently. For example, from the viewpoint of ensuring color reproducibility of images, it is preferable to be in the range of 1 to 30 mass %, more preferably in the range of 2 to 20 mass %.

The size of the colorant particles is preferably in the range of, for example, 10 to 1000 nm, more preferably in the range of 50 to 500 nm, and still more preferably in the range of 80 to 300 nm in terms of volume average particle size.

The volume average particle diameter may be a catalog value, and for example, the volume average particle diameter (volume-based median diameter) of a colorant is measured by "UPA-150" (manufactured by MicrotracBEL Corp.).

(1.6) Charge Control Agent

The charge control agent applicable to the toner base particles according to the present invention is not particularly limited. Various known compounds may be used. Examples thereof include a nigrosine dye, a metal salt of naphthenic acid or a higher fatty acid, an alkoxylated amine, a quaternary ammonium salt compound, an azo metal, and salicylic acid metal salt.

The amount of the charge control agent added is usually in the range of 0.1 to 10 mass %, preferably 0.5 to 5 mass % with respect to 100 mass % of the toner base particles finally obtained.

The size of the charge control agent particles is preferably in the range of 10 to 1000 nm, more preferably in the range of 50 to 500 nm, and still more preferably in the range of 80 to 300 nm in terms of number average primary particle diameter.

(1.7) External Additive

The toner particles may be used as a toner as they are, but may be treated with an external additive such as a fluidizing agent or a cleaning aid in order to improve fluidity, chargeability, and cleaning property.

Examples of the external additive include inorganic oxide particles such as silica particles, alumina particles, and titanium dioxide particles, inorganic stearic acid compound particles such as aluminum stearate particles and zinc stearate particles, and inorganic titanic acid compound particles such as strontium titanate and zinc titanate. These may be used alone or in combination of two or more types.

From the viewpoint of improving heat-resistant storage and environmental stability, these inorganic particles are preferably surface-treated with a silane coupling agent, a titanium coupling agent, a higher fatty acid, or a silicone oil.

The amount of external additive (total amount of external additives when multiple external additives are used) is preferably in the range of 0.05 to 5 parts by mass per 100 parts by mass of the toner base particles, and more preferably it is in the range of 0.1 to 3 parts by mass.

2. Physical Properties of Electrostatic Charge Image Developing Toner (Particle Size of Toner Particles)

As for the average particle diameter of the toner particles, it is preferable that the median diameter ($d_{50}$) on a volume basis is in the range of 3 to 15 μm, and more preferably in the range of 4 to 8 μm.

Within the above-described range, high reproducibility may be obtained even for very small dot images at the level of 1200 dpi.

The average particle diameter of the toner particles may be controlled by the concentration of the coagulant used in manufacturing, the amount of organic solvent added, the fusion time, and the composition of the binder resin.

For the measurement of the median diameter ($d_{50}$) of toner particles on a volume basis, a measuring device Multisizer 3 (manufactured by Beckman Coulter Corporation) to which a computer system equipped with the data processing software V3.51 is connected may be used. Alternatively, a successor (for example, Multisizer IV) may be used.

Specifically, the sample to be measured (toner) is added to a surfactant solution (for example, a surfactant solution made by diluting neutral detergent containing surfactant ingredients in pure water 10 times for the purpose of dispersing toner particles), and then ultrasonic dispersion is performed to prepare a toner particle dispersion liquid. This toner particle dispersion liquid is placed in a beaker containing ISOTONII (manufactured by Beckman Coulter Corporation) in a sample stand. This concentration allows us to obtain reproducible measurement values. In the measurement system, the number of particles counted is set to 25,000, the aperture diameter is set to 100 μm. The frequency values are calculated by dividing the measurement range of 2 to 60 μm into 256 parts, and the particle diameter of the 50% from the larger volume integrated fraction is obtained as the median diameter ($d_{50}$) on a volume basis.

(Average Circularity of Toner Particles)

The toner particles preferably have an average circularity in the range of 0.930 to 1.000, more preferably in the range of 0.950 to 0.995, from the viewpoint of enhancing the stability of charging characteristics and low-temperature fixability.

When the average circularity is within the above range, individual toner particles are less likely to be crushed. This makes it possible to stabilize chargeability of the toner by suppressing contamination of the frictional charge-applying member, and to enhance the image quality of the formed image.

The average circularity of toner particles may be measured using FPIA-3000 (manufactured by Sysmex Corporation).

Specifically, the measurement sample (toner) is soaked in an aqueous solution containing surfactant and dispersed by ultrasonic dispersion for 1 minute. Thereafter, the sample was dispersed by FPIA-3000 (Sysmex Corporation) in the HPF (high magnification imaging) mode, with the number of HPF detections between 3000 and 10000. When the number of HPF detections is within the above range, reproducible measurement values may be obtained. From the photographed particle images, calculate the circularity of each toner particle according to the following Formula (I), and then add the circularity of each toner particle and divide by the total number of toner particles to obtain the average circularity.

Circularity=(Circumference of a circle having the same projected area as the particle image)/(Circumference of the particle projection image)     Formula (I):

3. Developer

The electrostatic charge image developing toner according to the present invention may be used as a magnetic or non-magnetic single-component electrostatic charge image developer. It may also be mixed with a carrier to be used as a two-component electrostatic charge image developer. When the toner is used as a two-component electrostatic charge image developer, magnetic particles made of conventionally known materials such as iron, ferrite, magnetite and other metals, and alloys of such metals with aluminum, lead and other metals may be used as carriers, with ferrite particles being particularly preferred.

The carrier may be a coated carrier in which the surface of the magnetic particles is coated with a resin or other coating agent, or a dispersed carrier in which the magnetic fine powder is dispersed in a binder resin.

The median diameter ($d_{50}$) of the carrier on a volume basis is preferably in the range of 20 to 100 μm, and it is more preferable to be in the range of 25 to 80 μm.

The volume-based median diameter ($d_{50}$) of the carrier may be measured using, for example, a laser diffraction particle size analyzer equipped with a wet disperser (HELOS) (manufactured by SYMPATEC GmbH).

[Production Method of Electrostatic Charge Image Developing Toner]

It is preferable that the electrostatic charge image developing toner of the present invention contains toner base particles produced by an emulsion aggregation method having at least an aging step from the viewpoint of uniformity of particle size, controllability of shape, and ease of forming a core-shell structure or domain-matrix structure. It is also preferable to carry out the aging step in the range of −5 to 15° C. of the melting point of the mold release agent in order to control the glossiness.

When the aging step during the emulsion aggregation is carried out at a temperature of −5° C. or higher than the melting point of the mold release agent, the wax crystallizes and disappear as a component incompatible with the amorphous material of the low molecular weight component, so the amount of wax in the toner is less than the amount added when the toner is formulated, and the wax is not present in the toner in large amounts. Therefore, the amount of bleeding out of the wax onto the image is not increased and high gloss may be suppressed.

On the other hand, when the aging step during the emulsion aggregation is carried out at a temperature set to be 15° C. lower than the melting point of the mold release agent, the waxes in the toner will melt and will not be compatible with the amorphous material of the low molecular weight component in the vicinity, and the amount of the waxes existing as crystals in the toner will not be decreased. As a result, separation failure between the fixing belt and toner during image formation does not occur, and deterioration of fixing performance and low glossiness may be suppressed.

From the above, by conducting the aging step during the emulsion aggregation in the range of −5 to 15° C. of the melting point of the mold release agent, the compatibility of the wax and the additive may be controlled within the desired range. It is possible to suppress bleed out of the wax to the image at the time of toner fixing, and to control the glossiness within a desired range.

In addition to the emulsion aggregation method described above, other methods for producing the electrostatic charge image developing toner include, for example, a kneading and grinding method, a suspension polymerization method, a dissolution suspension method, a polyester elongation method, a dispersion polymerization method, and other known methods. The emulsion aggregation method is described in the following.

4. Emulsion Aggregation Method

The production method of toner particles according to the present invention by the emulsion aggregation method contains the following steps of: mixing an aqueous dispersion of crystalline material, an aqueous dispersion of amorphous vinyl resin particles, an aqueous dispersion of amorphous polyester resin particles or hybrid amorphous polyester resin particles, and an aqueous dispersion of colorant particles; and then aggregating the amorphous resin particles, the amorphous polyester resin particles or the hybrid amorphous polyester resin particles and colorant particles to produce toner particles.

The emulsion aggregation method is a method of forming toner particles in which a dispersion liquid of fine resin particles dispersed by a surfactant or dispersion stabilizer (hereinafter referred to as "resin particles") is mixed with a dispersion liquid of toner particle components, such as colorant particles, and aggregated by adding a coagulant until the desired toner particle diameter is achieved, and then or simultaneously with the aggregation, fusing the fine particles together and controlling their shape.

Here, the resin fine particles may be toner particles having a core-shell structure made of resins of different compositions, or composite particles formed by a plurality of layers having a domain-matrix structure.

The resin fine particles may be produced by, for example, an emulsion polymerization method, a miniemulsion polymerization method, a phase inversion emulsification method, or may be produced by combining several production methods. When the resin fine particles contain a mold release agent, a miniemulsion polymerization method is preferred among others.

When the toner particles according to the present invention contain a mold release agent, the resin fine particles may contain the mold release agent, or a dispersion liquid of mold release agent fine particles consisting only of the mold release agent may be separately prepared and aggregated together with the resin fine particles when they are aggregated.

Further, by the emulsion aggregation method, toner particles having a domain-matrix structure may also be obtained. Specifically, the toner particles having a domain-matrix structure are made by first aggregating (and fusing) the binder resin fine particles for the matrix particles and the colorant to produce the matrix particles. Next, the binder resin fine particles for the domain are added to the dispersion liquid of the matrix particles, and the binder resin fine particles for the domain are aggregated and fused from the inside to the surface of the matrix particles to form a domain in the matrix particles.

Hereinafter, an example of the step of the toner production method by the emulsion aggregation method will be described.

(4.1) Step (1) of Production Method of Toner by Emulsion Aggregation Method

In step (1), an aqueous dispersion of the crystalline resin particles is prepared as a dispersion liquid of the crystalline resin particles.

Specifically, a crystalline resin is synthesized and dissolved or dispersed in an organic solvent to prepare an oil phase liquid. This oil phase liquid is inversion emulsified to disperse crystalline resin particles in an aqueous medium. After controlling the particle size of the oil droplets to the desired size, the organic solvent is removed to obtain an aqueous dispersion of the crystalline resin.

As the organic solvent used for the oil phase liquid, one having a low boiling point and low solubility in water is preferable from the viewpoint of easy removal treatment after formation of oil droplets. Specific examples thereof include methyl acetate, ethyl acetate, methyl ethyl ketone, methyl isobutyl ketone, toluene, and xylene. One of these may be used alone or in combination of two or more.

The amount of organic solvent used is usually in the range of 1 to 300 parts by mass for 100 parts by mass of the crystalline resin.

The emulsification and dispersion of the oil phase liquid may be performed by utilizing mechanical energy.

(4.2) Step (2) of Production Method of Toner by Emulsion Aggregation Method

In step (2), an aqueous dispersion of amorphous vinyl resin particles is prepared as a dispersion liquid of the amorphous resin. At this stage, it is preferable to include a mold release agent in the amorphous vinyl resin particles.

Specifically, an amorphous vinyl resin is synthesized in an aqueous system to obtain an aqueous dispersion of the amorphous vinyl resin.

(4.3) Step (3) of Production Method of Toner by Emulsion Aggregation Method

In step (3), an aqueous dispersion of the amorphous polyester resin particles or the hybrid amorphous polyester resin is prepared.

An aqueous dispersion of the amorphous polyester resin particles or the hybrid amorphous polyester resin particles may be prepared in the same manner as above.

The average particle size of the amorphous polyester resin particles or the hybrid amorphous polyester resin particles is preferably in the range of 30 to 400 nm in terms of the volume-based median diameter ($d_{50}$). The volume-based median diameter of the amorphous polyester resin particles ($d_{50}$) is calculated using the Microtrac UPA-15 0 (manufacture by Nikkiso Co., Ltd.).

(4.4) Step (4) of Production Method of Toner by Emulsion Aggregation Method

In the step (4), the colorant is dispersed in an aqueous medium in the form of fine particles to prepare an aqueous dispersion of the colorant particles.

The aqueous dispersion of the colorant particles may be obtained by dispersing the colorant in an aqueous medium to which a surfactant is added above the critical micelle concentration (CMC).

Dispersion of a colorant may be performed using mechanical energy. The dispersing machine used is not particularly limited. Preferred examples thereof include an ultrasonic disperser, a mechanical homogenizer, a pressure disperser such as a Manton-Gaulin homogenizer or a pressure homogenizer, and a medium type disperser such as a sand grinder, a Getzmann mill or a diamond fine mill.

The colorant particles in the aqueous dispersion preferably have a volume-based median diameter ($d_{50}$) in the range of 10 to 300 nm, more preferably in the range of 100 to 200 nm, and still more preferably in the range of 100 to 150 nm.

The volume-based median diameter of the colorant particles ($d_{50}$) is calculated using the Microtrac UPA-150 (manufactured by Nikkiso Co., Ltd.).

(4.5) Step (5) of Production Method of Toner by Emulsion Aggregation Method

In step (5), the crystalline material particles, the amorphous vinyl resin particles, the amorphous polyester resin particles, the colorant particles, and the particles of other toner components are aggregated to form toner particles.

Specifically, a coagulant having a critical aggregation concentration or higher is added to a system in which an aqueous medium and aqueous dispersion of each particle are mixed to bring the temperature to a temperature equal to or higher than the glass transition temperature (Tg) of the amorphous resin particles to result in aggregation.

(Coagulant)

As a coagulant, there is no particular limitation, but those selected from metal salts such as alkali metal salts and alkaline earth metal salts are suitably used. Examples of the metal salt include monovalent metal salts such as sodium, potassium, and lithium; divalent metal salts such as calcium, magnesium, manganese, and copper; and trivalent metal salts such as iron and aluminum. Specific metal salts include sodium chloride, potassium chloride, lithium chloride, calcium chloride, magnesium chloride, zinc chloride, copper sulfate, magnesium sulfate, and manganese sulfate. Among these, it is particularly preferable to use a divalent metal salt because it may promote aggregation more stably. These may be used alone or in combination of two or more.

(4.6) Step (6) of Production Method of Toner by Emulsion Aggregation Method

In step (6), the toner particles formed by step (5) are aged and controlled to the desired shape. Step (6) may be performed as needed.

Specifically, the dispersion liquid of the toner particles obtained in step (5) is heated and agitated, and the heating temperature, agitation speed, and heating time, are adjusted so that the toner particles achieve the desired circularity.

<Step (5B) of Production Method of Toner by Emulsion Aggregation Method>

In step (5B), the toner particles obtained in step (5) or (6) may be used as matrix particles to form domains at least partially from the interior to the surface of the matrix particles. Step (5B) is preferably be performed when forming toner particles having a domain-matrix structure.

When forming the toner particles having a domain-matrix structure, the resin constituting the domain is dispersed in an aqueous medium to prepare a dispersion liquid of the resin particles of the domain, and the resin particles of the domain are aggregated and fused from the interior to the surface of the matrix particles. Thereby, a dispersion liquid of toner particles having a domain-matrix structure may be obtained.

A heat treatment process may be performed to more firmly aggregate and fuse the resin particles of the domain to the matrix particles. Heat treatment is preferably performed until the toner particles having the desired circularity are obtained.

(4.7) Step (7) of Production Method of Toner by Emulsion Aggregation Method

In step (7), the toner particle dispersion liquid is cooled. The preferred condition for the cooling step is to cool at a cooling rate of 1 to 20° C./min. The specific method of cooling treatment is not limited, and examples include cooling by introducing a refrigerant from outside the reaction vessel or cooling by directly injecting chilled water into the reaction system.

(4.8) Step (8) of Production Method of Toner by Emulsion Aggregation Method

In step (8), the toner particles are solid-liquid separated from the cooled toner particle dispersion liquid, and the toner cake (the toner particles formed into a cake in a wet state) obtained by solid-liquid separation is washed to remove surfactants, coagulants, and other adhesives.

Solid-liquid separation is not particularly limited and may be performed by centrifugal separation, decompression filtration using a Nutsche filter, or filtration using a filter press. In washing, the slurry is preferably washed with water until the electrical conductivity of the slurry reaches 10 μS/cm.

(4.9) Step (9) of Production Method of Toner by Emulsion Aggregation Method

In step (9), the toner cake is dried after washing. Examples of the dryer of the toner cake include a spray dryer, a vacuum freeze dryer, and a vacuum dryer. It is preferable to use a stationary shelf dryer, a mobile shelf dryer, a fluidized layer dryer, a rotary dryer, and a stirring type drying.

The water content of the toner particles after drying is preferably 5 mass % or less, and more preferably 2 mass %.

When the dried toner particles are aggregated by a weak intermolecular attractive force, the aggregate may be crushed. As the crushing processing device, a mechanical crushing device such as a jet mill, a Henschel mixer, a coffee mill, or a food processor may be used.

(4.10) Step (10) of Production Method of Toner by Emulsion Aggregation Method

In step (10), an external additive is added to the toner particles. Process (10) may be performed as needed.

A mechanical mixing device such as a Henschel mixer or a coffee mill may be used for adding the external additive.

5. Electrophotographic Image Forming Method

Hereinafter, each step in the electrophotographic image forming method in which the electrostatic charge image developing toner of the present invention may be used will be described.

The steps in image formation are preferably performed in steps used in a general electrophotographic image forming method, such as a charging step, an electrostatic latent image forming step, a developing step, a fixing step, and a cleaning step.

(Charging Step)

In this step, the electrophotographic photoreceptor is charged. The method of charging the electrophotographic photoreceptor is not particularly limited and may be any known method, such as a charging roller method where the electrophotographic photoreceptor is charged by a charging roller, for example.

(Electrostatic Latent Image Forming Step)

In this step, an electrostatic latent image is formed on the electrophotographic photoreceptor (electrostatic latent image carrier). The electrophotographic photoreceptor is not particularly limited, and examples thereof include a drum-shaped one made of an organic photosensitive member such as polysilane or phthalopolymethine.

The formation of an electrostatic latent image is performed, for example, by uniformly charging the surface of an electrophotographic photoreceptor with a charging means and exposing the surface of the photoreceptor to image by an exposure means. The “electrostatic latent image” is an image formed on the surface of the electrophotographic photoreceptor by such charging means.

The charging means and the exposure means are not particularly limited, and those commonly used in electrophotographic systems may be used.

(Developing Step)

The developing step is a step of developing an electrostatic latent image with a toner (generally, a dry developer containing a toner) to form a toner image.

The toner image is formed by using, for example, a developing means including a stirrer for frictionally stirring and charging the toner using a dry developer containing a toner, and a rotatable magnet roller.

Specifically, in the developing means, for example, a toner and a carrier are mixed and agitated, and the toner is charged by friction during this process and held on the surface of the rotating magnetic roller to form a magnetic brush. Since the magnetic roller is located near the electrophotographic photoreceptor, a part of the toner comprising the magnetic brush formed on the surface of the magnetic roller moves to the surface of the electrophotographic photoreceptor by electrical attractive force. As a result, the electrostatic latent image is developed by the toner to form a toner image on the surface of the electrophotographic photoreceptor.

(Transferring Step)

In this step, the toner image is transferred to the recording medium. The transfer of the toner image to the transfer material is performed by peeling and charging the toner image onto the transfer material.

As the transfer means, for example, a corona transfer device by corona discharge, a transfer belt, or a transfer roller may be used.

The transferring step may be performed, for example, by using an intermediate transfer body. A toner image is first transferred onto the intermediate transfer body, and then the toner image is secondarily transferred onto the transfer material. It can also be performed by directly transferring the toner image formed on the electrophotographic photoreceptor onto the transfer material.

(Fixing Step)

In the fixing step according to the present invention, a transfer material to which an unfixed image (toner image) formed by using a toner is transferred is passed between a heated fixing belt or fixing roller and a pressure roller which is a pressure member. As a result, the unfixed image is fixed to the transfer material.

As the method of the fixing step, as described above, a belt fixing method or a roller fixing method may be mentioned. It is composed of a fixing belt or a fixing roller as a fixing rotating body and a pressure roller as a pressure member provided in a state of being pressurized so as to form a fixing nip portion on the fixing belt or the fixing roller.

In the fixing step according to the present invention, it is preferable that the fixed toner image has a region where the toner adhesion amount is 2.0 g/m$^2$ or less because the dot reproducibility of the halftone is good.

(Cleaning Step)

In this step, the developer remaining on the developer carrier, such as the photoreceptor and intermediate transfer body, that has not been used for image formation or has not been transferred is removed from the developer carrier.

The cleaning method is not particularly limited, but a method using a blade having a tip abutting against a cleaning target such as a photoreceptor and scraping the surface of the photoreceptor is preferable.

6. Electrophotographic Image Forming Apparatus

The image forming apparatus contains: an image forming unit that forms a toner image on a transfer material using the electrostatic charge image developing toner of the invention, a fixing member that faces the upper surface of the transfer material, a pressure member that forms a fixing nip facing the fixing member, a drive source that drives each of the fixing member and the pressurizing member, a drive control unit that controls the speed of each surface of the fixing member and the pressure member.

As an example of the image forming apparatus of the present invention, an example of a schematic configuration of a color tandem type image forming apparatus 100 including a fixing member and a pressure member will be described with reference to FIG. 3. This imaging apparatus is a multifunctional machine equipped with a scanner, a copying machine, a printer, and other functions, and it is called as an MFP (Multi Function Peripheral or Multi Function Printer).

Figure 3:
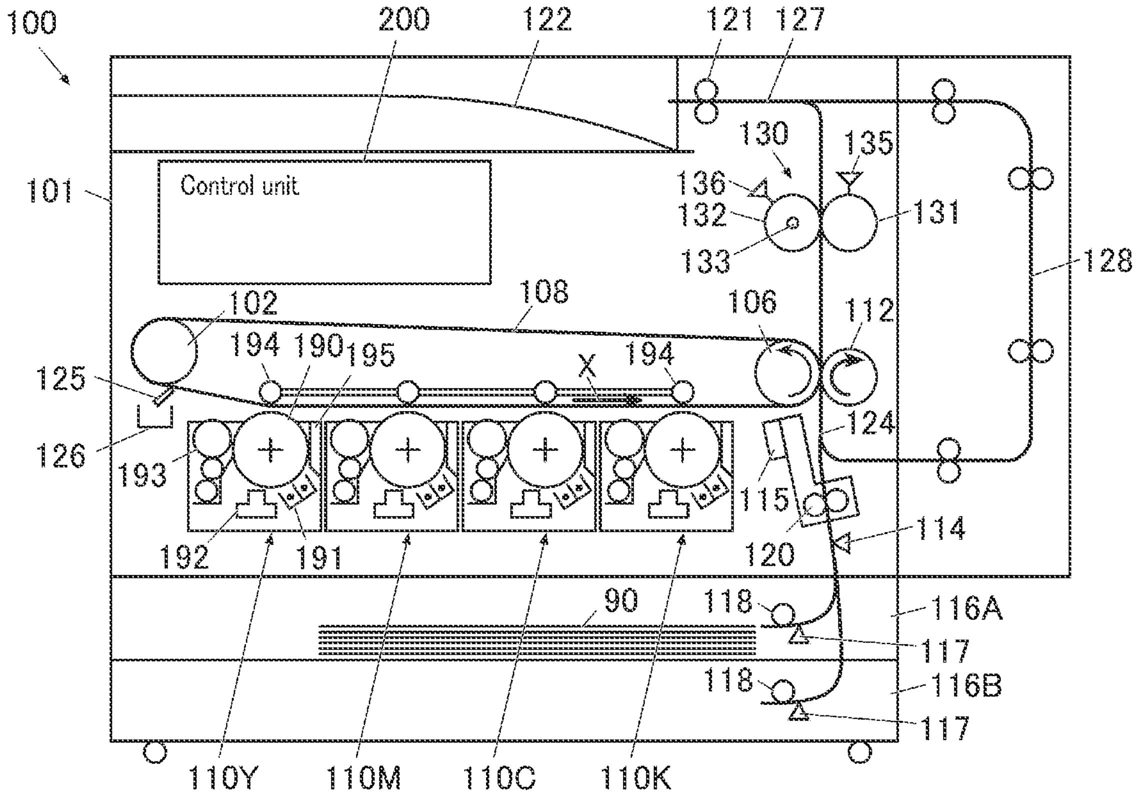
FIG. 3 is a schematic cross-sectional view showing an example of the internal configuration of the image forming apparatus main body.

As shown in FIG. 3, the image forming apparatus 100 is provided with an annular intermediate transfer belt 108 wound around two rollers 102 and 106 and moving in the circumferential direction at substantially the center of the main body casing 101.

Of the two rollers 102 and 106, one roller 102 is located on the left side in FIG. 3, and the other roller 106 is located on the right side in FIG. 3. The intermediate transfer belt 108 is supported by these rollers 102 and 106 and is rotationally driven in the direction of arrow X.

Below the intermediate transfer belt 108, in the order from the left side in FIG. 3, image forming segments 110Y, 110M, 110C and 110K corresponding to the yellow (Y), magenta (M), cyan (C), and black (K) color toners are arranged side by side.

The image forming segments 110Y, 110M, 110C, and 110K are configured in the same manner as each other except for the difference in the toner colors handled by them.

For example, the yellow image forming segment 110Y includes a photoreceptor drum 190, a charging device 191, an exposure device 192, a developing device 193 that develops using the toner, and a cleaner device 195 in one piece.

A primary transfer roller 194 is provided at a position facing the photoreceptor drum 190 with the intermediate transfer belt 108 interposed therebetween.

At the time of image formation, the surface of the photoreceptor drum 190 is first uniformly charged by the charging device 191 and then the surface of the photoreceptor drum 190 is exposed by the exposure device 192 to form a latent image there. Next, the developing device 193 develops a latent image on the surface of the photoreceptor drum 190 into a toner image. This toner image is transferred to the intermediate transfer belt 108 by applying a voltage between the photoreceptor drum 190 and the primary transfer roller 194. The transfer residual toner on the surface of the photoreceptor drum 190 is cleaned by the cleaner device 195.

As the intermediate transfer belt 108 moves in the X direction of the arrow, each image forming segment 110Y, 110M, 110C, 110K superimposes and forms a toner image of four colors as an output image on the intermediate transfer belt 108.

On the left side of the intermediate transfer belt 108, a cleaning device 125 for removing residual toner from the surface of the intermediate transfer belt 108 and a toner recovery box 126 for collecting the toner removed by the cleaning device 125 are provided.

On the right side of the intermediate transfer belt 108, a secondary transfer roller 112 is provided with a transfer path 124 for the transfer material interposed therebetween. The transport roller 120 is provided at a position corresponding to the upstream side of the secondary transfer roller 112 in the transport path 124. An optical density sensor 115 for detecting the toner pattern on the intermediate transfer belt 108 is provided.

A fixing device 130 for fixing the toner to the transfer material is provided in the upper right portion of the main body casing 101.

The fixing device 130 includes a fixing roller which is a pair of fixing members and a pressure roller which is a pressure member extending perpendicularly to the paper surface in FIG. 3. In FIG. 3, there is a heating roller 132 as a fixing roller, and the other is a pressure roller 131.

The heating roller 132 and the pressure roller 131 have a drive unit (not shown) and a drive control unit (control unit 200 in FIG. 3), respectively, and control the surface speeds of the rotationally driven heating roller 132 and the pressure roller 131.

The heating roller 132 is heated to a predetermined target temperature (for example, a fixing temperature in the range of 180 to 200° C.) by the heater 133. The pressure roller 131 is urged toward the heating roller 132 by a spring (not shown). As a result, the pressure roller 131 and the heating roller 132 form a nip portion for fixing.

When the transfer material 90 on which the toner image is transferred passes through this nip portion, the toner image is fixed on the transfer material 90. The temperatures of the pressure roller 131 and the heating roller 132 are detected by the temperature sensors 135 and 136, respectively.

At the lower part of the main body casing 101, paper feed cassettes 116A and 116B for accommodating the transfer material 90 are provided in two stages. FIG. 3 shows a state in which the transfer material 90 is housed only in the paper feed cassette 116A.

Each of the paper cassettes 116A and 116B is provided with a paper feed roller 118 for feeding the transfer material and a paper feed sensor 117 for detecting the paper feed material.

Inside the main body casing 101, a control unit 200 including a CPU (Central Processing Unit) that controls the operation of the entire image forming apparatus is provided. The control unit 200 also has a function of controlling the rotational drive of the drive source. The difference between the surface speed of the fixing member and the surface speed of the pressure member when the image is fixed by being pinched between the fixing member and the pressure member is changed by inputting a condition in advance.

At the time of image formation, the transfer material 90 is sent out one by one from the paper cassette 116A to the transport path 124 by the paper feed roller 118 under the control of the control unit 200. The transfer material 90 sent out to the transfer path 124 is sent to the toner transfer position between the intermediate transfer belt 108 and the secondary transfer roller 112 by the transfer roller 120 at the timing by the resist sensor 114.

On the other hand, as described above, the toner images of four colors are superimposed on the intermediate transfer belt 108 by the image forming segments 110Y, 110M, 110C, 110K. The four-color toner image on the intermediate transfer belt 108 is transferred to the transfer material 90 fed to the toner transfer position by the secondary transfer roller 112.

The transfer material 90 to which the toner image is transferred is conveyed through a nip portion formed by the pressure roller 131 and the heating roller 132 of the fixing device 130, and is heated and pressurized. As a result, the toner image is fixed on the transfer material 90.

Finally, the transfer material 90 on which the toner image is fixed is discharged by the paper ejection roller 121 to the paper ejection tray portion 122 provided on the upper surface of the main body casing 101 through the paper ejection path 127.

The image forming apparatus 100 is provided with a switchback transport path 128 for feeding the transfer material 90 back to the toner transfer position in the case of double-sided printing.

As described above, the pressure roller 131 constitutes one of the fixing rollers, and a silicone rubber roller is used here.

The embodiment to which the present invention is applicable is not limited to the above-described embodiment, and may be appropriately changed without departing from the spirit of the present invention.

Further, in the above description, the case of the heating roller as the fixing member and the case of the pressure roller as the pressure member have been described as an example, but a conventionally known fixing belt method may also be manufactured and used in the same manner. Further, the fixing belt referred to in the present specification is a fixing belt made of silicone rubber used for fixing toner to a transfer material in an image forming apparatus.

Specifically, it refers to a known fixing belt used in a fixing device described in, for example, JP-A 2017-194550, JP-A 2017-173445, and JP-A2017-97187.

EXAMPLES

Hereinafter, the present invention will be specifically described with reference to examples, but the present invention is not limited thereto. Although the term "parts" or '%' is used in the examples, it represents "parts by mass" or "mass %" unless otherwise specified.

<<Production of Toner>>

Preparation of Toner 1

Preparation of Fine Particle Dispersion Liquid (A1) of Styrene-Acrylic Resin (1)

(1) First Stage Polymerization (Preparation of Dispersion Liquid of "Resin Fine Particles (a1)")

In a reaction vessel equipped with a stirrer, a temperature sensor, a temperature control device, a cooling tube, and a nitrogen introduction device was charged an anionic surfactant solution in which 2.0 parts by mass of an anionic surfactant "sodium lauryl sulfate" was dissolved in 2,900 parts by mass of ion-exchanged water in advance. The internal temperature was raised to 80° C. while stirring at a stirring speed of 230 rpm. 9.0 parts by mass of the polymerization initiator "potassium persulfate (KPS)" was added to this surfactant solution to bring the internal temperature to 78° C., and then the monomer solution (1) having the following composition was added dropwise over a period of 3 hours. After completion of the dropping, polymerization (first stage polymerization) was carried out by heating and stirring at 78° C. for 1 hour to prepare a dispersion liquid of "resin fine particles (a1)".

(Monomer Solution (1))

Styrene: 540 parts by mass n-Butyl acrylate: 270 parts by mass

Methacrylic acid: 65 parts by mass n-Octyl mercaptan: 17 parts by mass (2) Second Stage Polymerization: Formation of Intermediate Layer (Preparation of Dispersion Liquid of "Resin Fine Particles ($A_{11}$)")

In a flask equipped with a stirrer, a monomer solution (2) of the following composition was mixed with 57 parts by mass of ester wax (WEP-3, melting point: 77° C., manufactured by NOF Corporation) as a mold release agent. Then, 90 parts by mass of disproportionated rosin ester (A-100, manufactured by Arakawa Chemical Co., Ltd.) was added as an amorphous material, and the mixture was heated to 85° C. and dissolved to prepare a monomer solution (2).

(Monomer Solution (2))

Styrene: 225 parts by mass n-Butyl acrylate: 42.2 parts by mass

2-Ethylhexyl acrylate: 42.2 parts by mass

Methacrylic acid: 31.4 parts by mass n-Octyl mercaptan: 5 parts by mass

On the other hand, a surfactant solution prepared by dissolving 2 parts by mass of an anionic surfactant "sodium lauryl sulfate" in 1,100 parts by mass of ion-exchanged water was heated to 90° C. To this surfactant solution, 40 parts by mass of a dispersion liquid of "resin fine particles (a1)" was added in terms of solid content of "resin fine particles (a1)". Then, the above-mentioned monomer solution (2) was mixed and dispersed for 60 minutes by a mechanical disperser "CLEARMIX" (manufactured by M-Technique Co., Ltd.) having a circulation path, and a dispersion liquid containing emulsified particles having a dispersed particle diameter of 350 nm was prepared.

An aqueous initiator solution in which 4.9 parts by mass of a polymerization initiator "KPS" was dissolved in 110 parts by mass of ion-exchanged water was added to this dispersion. The system was heated and stirred at 90° C. for 2 hours to polymerize (second stage polymerization), and a dispersion liquid of "resin fine particles of "$a_{11}$)" was prepared.

(3) Third Stage Polymerization: Formation of Outer Layer (Preparation of Fine Particle Dispersion Liquid (A1) of Styrene-Acrylic Resin (1))

An aqueous initiator solution prepared by dissolving 5.7 parts by mass of the polymerization initiator "KPS" in 110 parts by mass of ion-exchanged water was added to the dispersion liquid of the above "resin fine particles (a11)", and under the temperature condition of 80° C., the monomer solution (3) having the following composition was added dropwise over a period of 2 hours.

(Monomer Solution (3))

Styrene: 355 parts by mass n-Butyl acrylate: 151 parts by mass

Methacrylic acid: 44 parts by mass n-Octyl mercaptan: 9 mass parts

After completion of the dropping, polymerization (third stage polymerization) was carried out by heating and stirring for 1 hour. The solution was then cooled down to 28° C., and a "fine particle dispersion liquid (A1) of styrene-acrylic resin (1)" in which fine particles (volume average particle diameter; 232 nm) of styrene-acrylic resin (1) were dispersed in an anionic surfactant solution was prepared. The glass transition temperature measured by the above method using the DSC ("Diamond DSC", manufactured by PerkinElmer, Inc.) of this styrene-acrylic resin (1) was 40° C.

Preparation of Colorant (Carbon Black) Particle Dispersion Liquid [Bk]

90 g of sodium dodecyl sulfate was stirred and dissolved in 1,600 g of ion-exchanged water, and while stirring this solution, 420 g of carbon black (Furness Black) "REGAL™ 330R" (manufactured by Cabot Corporation) was gradually added. Then, a colorant particle dispersion liquid [Bk] in which the colorant particles [Bk] were dispersed was prepared by performing a dispersion treatment using a stirrer "CLEARMIX™" (manufactured by M-Technique Co., Ltd.).

The volume-based median diameter of the colorant particles [Bk] in the colorant particle dispersion liquid [Bk] was measured using an electrophoretic light scattering photometer "ELS-800" (manufactured by Otsuka Electronics Co., Ltd.) and found to be 120 nm.

Preparation of Toner Base Particles 1

(1) Aggregation-Fusion Step

In a reaction vessel equipped with a stirrer, a temperature sensor, and a cooling tube, 126 parts by mass (in terms of solid content) of "styrene-acrylic resin (1) fine particle dispersion liquid (A1)" as a binder resin fine particle dispersion liquid, and 100 parts by mass of ion-exchanged water were added. Then, a 5 mol/liter aqueous sodium hydroxide solution was added to adjust the pH to 10 and the liquid temperature to 20° C.

Further, 11 parts by mass of "colorant (carbon black) particle dispersion liquid [Bk]" in terms of solid content was added, and the pH was adjusted to 10 again with an aqueous sodium hydroxide solution.

Then, an aqueous solution prepared by dissolving 12.8 parts by mass of magnesium chloride in 12.8 parts by mass of ion-exchanged water was added under stirring at 20° C. over a period of 10 minutes. Then, after leaving it for 3 minutes, the temperature rise was started. The temperature of this system was raised to 70° C. over a period of 60 minutes, and the particle growth reaction was continued while maintaining 70° C.

In this state, the particle size of the associated particles (toner base particle precursor) was measured with "Multisizer 4" (manufactured by Beckman Coulter Corporation). When the median diameter ($d_{50}$ diameter) on a volume basis reached 6.2 μm, the number of stirring was increased and particle growth was stopped. After that, the temperature was further raised, and the particles were heated and stirred at 82° C. to promote the fusion of the particles. Using a flow-type particle image analyzer "FPIA-3000" (manufactured by Sysmex Corporation) (HPF detection number was set to 4000), when the average circularity reaches 0.950, the mixture was cooled to 30° C. and "a dispersion liquid of toner base particles 1" was obtained.

(2) Washing-Drying Step

The "dispersion liquid of toner base particles 1" produced in the aggregation-fusion step was solid-liquid separated by a centrifuge to remove coarse particles and fine particles to form a wet cake of toner base particles 1. The wet cake was washed with ion-exchanged water at 35° C. until the electrical conductivity of the slurry in 10 times the amount of ion-exchanged water reached 5 μS/cm. Then the cake was transferred to a "Flash Jet Dryer" (Seishin Enterprises, Ltd.)

and dried until the moisture content was 0.5 mass % to produce "toner base particles 1".

(3) External Additive Treatment Step

To the above "toner base particles 1", 2.5 parts by mass of hydrophobic silica particles (silica particles surface-modified with HMDS, number average primary particle diameter=120 nm) as an external additive with respect to 100 parts by mass of the toner base particles, 1.0 part by mass of hydrophobic silica particles (silica particles surface-modified by HMDS, number average primary particle diameter=12 nm), and 0.6 part by mass of hydrophobic titania particles (number average primary particle diameter=20 nm) were added and mixed with a Henschel mixer to prepare "toner 1".

Preparation of Toner 2

Toner 2 was prepared in the same way as in the preparation of toner 1, except that the mold release agent for the second stage polymerization was changed to 122.4 parts by mass and the amorphous material was changed to 204 parts by mass.

Preparation of Toner 3

Toner 3 was prepared in the same way as in the preparation of toner 1, except that the aging temperature after particle growth in the process of toner base particle preparation was set to 72° C.

Preparation of Toner 4

Toner 4 was prepared in the same way as in the preparation of toner 1, except that the temperature was not raised and the temperature was maintained at 70° C. after the particles growth in the process of producing the toner base particles.

Preparation of Toner 5

Toner 5 was prepared in the same way as in the preparation of toner 1, except that the mold release agent for the second stage polymerization was changed to HNP-51 (melting point: 77° C.) as a hydrocarbon mold release agent.

Preparation of Toner 6

Toner 6 was prepared in the same way as in the preparation of toner 1, except that the mold release agent for the second stage polymerization was changed to 37 parts by mass and the amorphous material was changed to 98 parts by mass.

Preparation of Toner 7

Toner 7 was prepared in the same way as in the preparation of toner 1, except that the mold release agent for the second stage polymerization was changed to 67 parts by mass and the amorphous material was changed to 86 parts by mass.

Preparation of Toner 8

Toner 8 was prepared in the same way as in the preparation of toner 1, except that the amorphous material for the second-stage polymerization was not added.

Preparation of Toner 9

Toner 9 was prepared in the same way as in the preparation of toner 1, except that the mold release agent for the second stage polymerization was changed to 142.8 parts by mass and the amorphous material was changed to 238 parts by mass Preparation of Toner 10

Toner 10 was prepared in the same way as in the preparation of toner 1, except that n-octyl mercaptan in the monomer solution (2) was changed to be 7.5 parts by mass and n-octyl mercaptan in the monomer solution (3) was changed to be 13.5 parts by mass.

Preparation of Toner 11

Toner 11 was prepared in the same way as in the preparation of toner 1, except that the following crystalline polyester resin [C1] was added instead of the amorphous material.

Synthesis of Crystalline Polyester Resin

In a 5 L reaction vessel equipped with a stirrer, a temperature sensor, a cooling tube, and a nitrogen inlet, 300 parts by mass of a polyvalent carboxylic acid compound: sebacic acid (molecular weight 202.25) and 170 parts by mass of a polyhydric alcohol compound: 1,6-hexanediol (molecular weight 118.17) were charged. While stirring this system, raise the internal temperature was raised to 190° C. over a period of 1 hour. After confirming that the mixture was uniformly stirred, $Ti(OBu)_4$ was added as a catalyst in an amount of 0.003 mass % with respect to the amount of the polyvalent carboxylic acid compound charged.

Then, while distilling off the generated water, the internal temperature was raised from 190° C. to 240° C. over a period of 4 hours, and the dehydration condensation reaction was continued for 6 hours under the condition of a temperature of 240° C. to carry out polymerization. Thus, a crystalline polyester resin [C1] was obtained. The obtained crystalline polyester resin [C1] had a melting point (Tm) of 77° C. and a number average molecular weight of 5,000.

Preparation of Developer

For the toners 1 to 11 produced as described above, a ferrite carrier having a volume average particle size of 40 μm coated with a copolymer resin of cyclohexyl methacrylate and methyl methacrylate (monomer mass ratio=1:1) was used. Developers 1 to 11 were prepared by mixing so that the toner concentration was 6 mass %. The mixture was mixed for 30 minutes using a V-type mixer.

[Evaluation Methods and Evaluation Criteria]

Each evaluation method and evaluation criteria were performed according to the methods and criteria shown below. The results are shown in Table I.

TABLE I

| Example or Comparative Example | Toner No. | Mold release agent: Type | Mold release agent: Meting point [° C.] | Mold release agent: Added amount [parts by mass] (*1) | Mold release agent: Main peak top (× 10,000) | Low molecular weight component (Amorphous material): Type | Low molecular weight component (Amorphous material): Mw (*2) | Low molecular weight component (Amorphous material): Added amount [parts by mass] (*3) | (*1)/(*3) | Toner production step Production method |
|---|---|---|---|---|---|---|---|---|---|---|
| Example 1 | 1 | Ester | 77 | 57.0 | 1.6 | Amorphous | 600 | 90 | 0.6 | Emulsion aggregation |
| Example 2 | 2 | Ester | 77 | 122.4 | 1.6 | Amorphous | 600 | 204 | 0.6 | Emulsion aggregation |
| Example 3 | 3 | Ester | 77 | 57.0 | 1.6 | Amorphous | 600 | 90 | 0.6 | Emulsion aggregation |
| Example 4 | 4 | Ester | 77 | 57.0 | 1.6 | Amorphous | 600 | 90 | 0.6 | Emulsion aggregation |
| Example 5 | 5 | Hydrocarbon | 77 | 57.0 | 1.6 | Amorphous | 600 | 90 | 0.6 | Emulsion aggregation |
| Example 6 | 6 | Ester | 77 | 37.0 | 1.6 | Amorphous | 600 | 98 | 0.4 | Emulsion aggregation |
| Example 7 | 7 | Ester | 77 | 67.0 | 1.6 | Amorphous | 600 | 86 | 0.8 | Emulsion aggregation |
| Comparative Example 1 | 8 | Ester | 77 | 57.0 | 1.6 | — | — | — | — | Emulsion aggregation |
| Comparative Example 2 | 9 | Ester | 77 | 142.8 | 1.6 | Amorphous | 600 | 238 | 0.6 | Emulsion aggregation |
| Comparative Example 3 | 10 | Ester | 77 | 57.0 | 1.6 | Amorphous | 600 | 90 | 0.6 | Emulsion aggregation |
| Comparative Example 4 | 11 | Ester | 77 | 57.0 | 1.6 | Amorphous | 600 | 90 | 0.6 | Emulsion aggregation |

| Example or Comparative Example | Toner production step Aging temperature [° C.] | GPC area ratio [%]: Evalutaion | GPC area ratio [%]: (*4) | Low-temperature fixability: Evalutaion | Low-temperature fixability: Temperature [° C.] (*5) | Tacking | Gloss: Evalutaion | Gloss: Glossiness [°] |
|---|---|---|---|---|---|---|---|---|
| Example 1 | 82 | AA | 10 | AA | 120 | No | AA | 10 |
| Example 2 | 82 | AA | 19 | AA | 110 | No | AA | 15 |
| Example 3 | 72 | AA | 10 | AA | 120 | No | AA | 12 |
| Example 4 | 70 | AA | 11 | AA | 120 | No | AA | 15 |
| Example 5 | 82 | AA | 12 | AA | 120 | No | AA | 15 |
| Example 6 | 82 | AA | 13 | AA | 125 | No | AA | 9 |
| Example 7 | 82 | AA | 14 | AA | 120 | No | AA | 15 |
| Comparative Example 1 | 82 | BB | 3 | BB | 130 | No | AA | 15 |
| Comparative Example 2 | 82 | BB | 22 | AA | 110 | No | BB | 17 |
| Comparative Example 3 | 82 | AA | 10 | AA | 120 | No | BB | 30 |
| Comparative Example 4 | 82 | BB | 3 | AA | 120 | Yes | BB | 20 |

*1: Added amount of mold release agent
*2: Mw is a weight average molecular weight
*3: Added amount of Low molecular weight component
*4: An area ratio of an amorphous material of a low molecular weight component with respect to the total amount of the binder resin in the molecular weight distribution curve
*5: Under-offset elimination temperature (1) Low-Temperature Fixability (Evaluation Method)

As an image forming apparatus, a commercially available full-color multifunction device "bizhub PRO C6500" (manufactured by Konica Minolta, Inc.) was used. This apparatus was modified so that the surface temperature of the fixing upper belt could be changed. Developers 1 to 11 were mounted as two-component developers for black, respectively. A test to output a solid image (black) with a black toner adhesion amount of 11.3 g/$m^2$ on the recording material "NPi high-quality paper 128 g/$m^2$" (manufactured by Nippon Paper Industries) at a fixing speed of 300 mm/sec was performed while changing the temperature of the fixing upper belt from 200° C. to decrease in 5° C. increments. The process was repeated until an under-offset occurred.

The term "under-offset" here refers to an image defect in which the solid image of the toner is peeled off from a transfer material such as recording paper due to insufficient melting of the solid image by the heat given to the toner as it passes through the fixing machine.

The lowest surface temperature of the upper fusing belt at which no under-offset occurred was investigated, and this was used as the lower limit temperature of fixing to evaluate the low-temperature fixing performance. In each test, the fixing temperature refers to the surface temperature of the upper fixing belt, and the surface temperature of the lower fixing roller was set at 70° C. Evaluation of low-temperature fixability was performed according to the following evaluation criteria.

(Evaluation Criteria)

The lower the lower limit temperature of fixing (the temperature until the under offset occurs), the better the low-temperature fixability. In this evaluation, the case where the temperature was 125° C. or lower as shown below was regarded as acceptable.

AA: The lower limit temperature of fixing is 125° C. or less.

BB: The lower limit temperature of fixing is larger than 125° C.

(2) Tacking Property (Evaluation Method)

Figure 4:
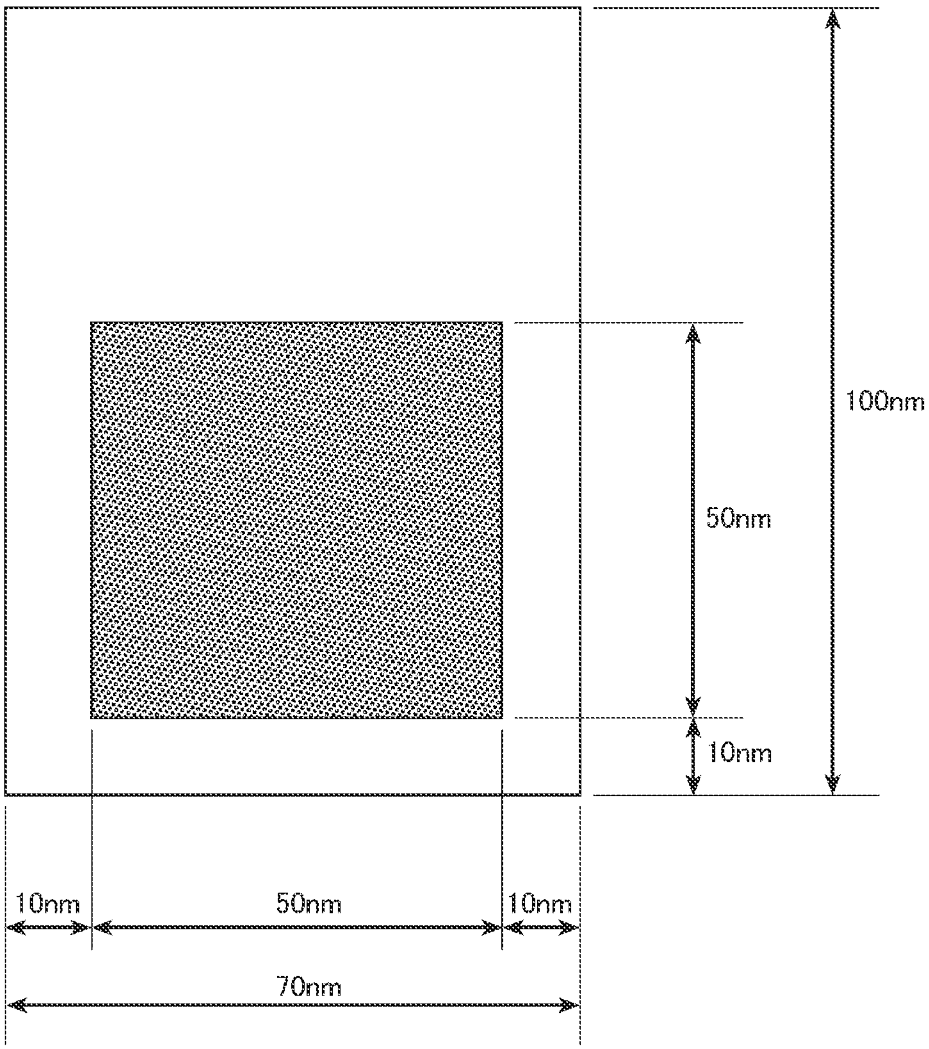
FIG. 4 is a diagram for explaining the tacking evaluation method in the example.

As an image forming apparatus, a commercially available full-color multifunction device "bizhub PRESS C1070" (manufactured by Konica Minolta, Inc.) was used. The image shown in FIG. 4 (toner adhesion amount 10.0 $g/m^2$) was formed on A4 HAMMERMILL Laser Print 241b (basis weight 90 $g/m^2$) manufactured by HAMMERMILL in an environment of normal temperature and humidity (temperature 20° C., humidity 50% RH).

Figure 5:
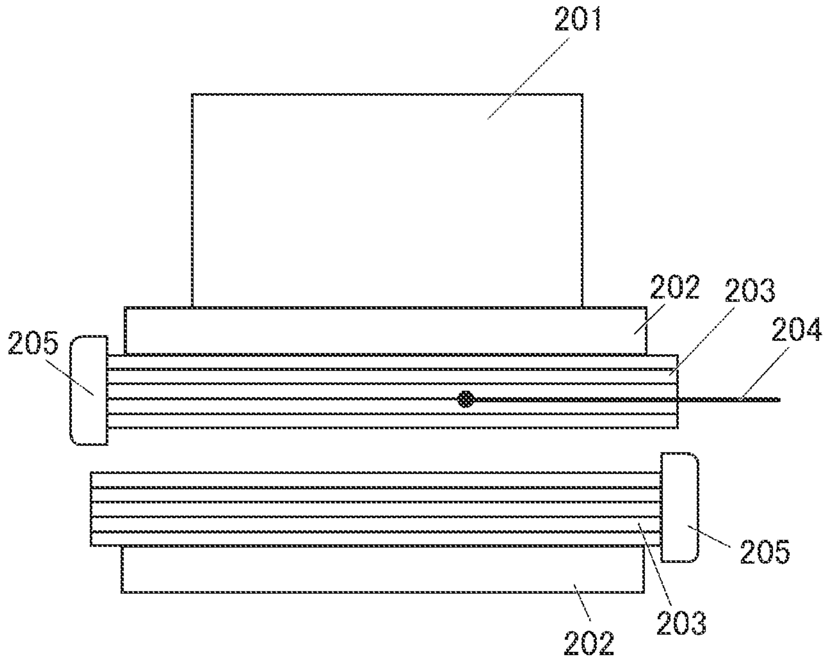
FIG. 5 is a diagram for explaining the tacking evaluation method in the example.

Next, the surface temperature of the pressure roller of the fixing device is set to 100° C. The surface temperature of the heating roller was set to a temperature over 25° C. of the temperature when the image stain due to the fixing offset was not visually confirmed by the low temperature fixing test, and fixing was performed for two sheets. As shown in FIG. 5, a weight (201), an aluminum plate (202), a pinching paper (203), and a thermocouple (204) were set. As for the pinching paper (203), five sheets of A4 HAMMERMILL Laser Print 241b were stacked, and the ends thereof were fixed with a tape (205). Further, the thermocouple (204) was inserted and pinched between the third and fourth sheets from the top of the pinching paper (203).

Figure 6:
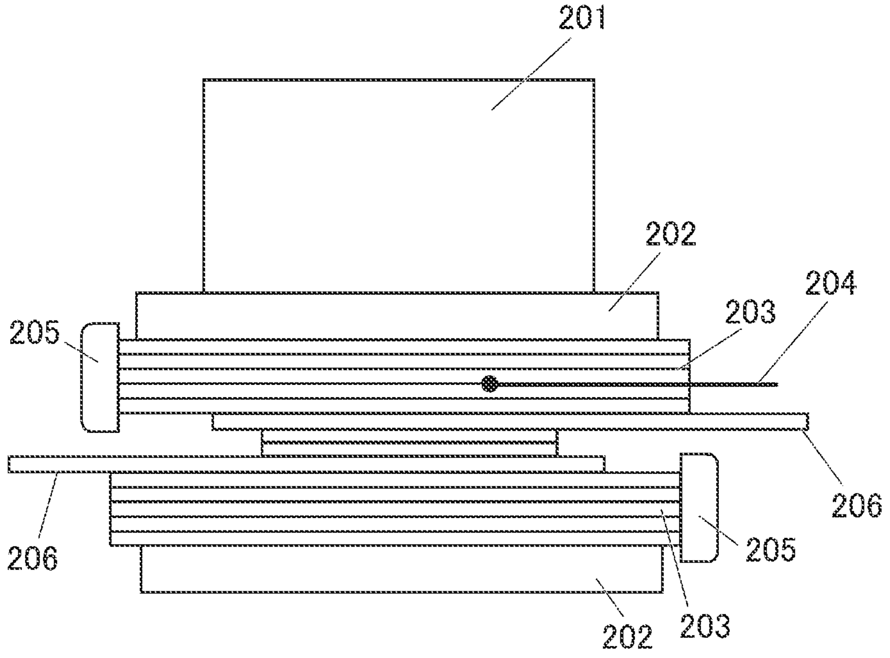
FIG. 6 is a diagram for explaining the tacking evaluation method in the example.

The set pinching jig was placed in the oven "DRM420DD" manufactured by ADVANTEC and it was heated. After preheating for 2 hours at a temperature setting higher than the target temperature, the set temperature was adjusted. After confirming that it was stable at the set temperature, the oven was opened. As shown in FIG. 6, the image portions of the two fixed images (206) and (206) were overlapped with each other, pinched with a pinching jig, and the oven was closed and left to stand.

After confirming that the temperature in the oven has stabilized at the set temperature again, it was left for 1 minute. After that, the superimposed fixed images (206) and (206) were taken out, and it was evaluated whether the images would stick to each other.

(Evaluation Criteria)

No: Tacking did not occur.

Yes: Tacking occurred.

(3) Glossiness (Evaluation Method)

As an image forming device, a commercially available full-color multifunction device "bizhub PRO C6500" (manufactured by Konica Minolta, Inc.) was modified.

On the transfer material "POD gloss coated paper 128 $g/m^2$" (manufactured by Oji Paper Co., Ltd.), a solid image patch (2.5 cm×4 cm) with a toner adhesion of 4.5 $g/m^2$ was placed in three places in the longitudinal direction of the paper. The central image in the width direction was fixed under standard temperature conditions.

The obtained images were measured with a gloss meter (at 60°, manufactured by Gardner Corporation) and the average value of three locations was obtained.

(Evaluation Criteria)

AA: Glossiness is 15° or less.

BB: Glossiness is larger than 15°.

(4) The area ratio of the amorphous material of the low molecular weight component to the total amount of the binder resin in the molecular weight distribution curve of the toner component for electrostatic charge image developing toner (in Table I, it is expressed as the amorphous material GPC area ratio.)

(Evaluation Method)

The method of calculating the area ratio (evaluation method) of the amorphous material of the low molecular weight component with respect to the total amount of the binder resin in the molecular weight distribution curve of the toner component for electrostatic charge image developing toner will be omitted because it has been described above.

(Evaluation Criteria)

AA: GPC area ratio is in the range of 10 to 20%.

BB: GPC area ratio is outside the range of 10 to 20%.

As is clear from Table I, the examples are superior to the comparative examples.

Although embodiments of the present invention have been described and illustrated in detail, the disclosed embodiments are made for purposes of illustration and example only and not limitation. The scope of the present invention should be interpreted by terms of the appended claims.

DESCRIPTION OF SYMBOLS

90: Transfer material
100: Image forming apparatus
101: Main body casing
108: Intermediate transfer belt
110Y, 110M, 110C, 110K: Image forming segment
112: Secondary transfer roller
120: Transfer roller
125: Cleaning device
126: Toner recovery box
130: Fixing device
131: Pressure roller
132: Heating roller
190: Photoreceptor drum
191: Charging device
192: Exposure device
193: Developer
194: Primary transfer roller
195: Cleaner device
200: Control unit
201: Weight
202: Aluminum plate
203: Pinching paper
204: Thermocouple
205: Tape
206: Fixed image

What is claimed is:

1. An electrostatic charge image developing toner comprising toner base particles containing a binder resin an a mold release agent, wherein a molecular weight corresponding to a main peak top of a molecular weight distribution curve of constituent components of the electrostatic charge image developing toner obtained by gel permeation chromatography is 15,000 or more, in comparison of an area ratio of each peak in the molecular weight distribution curve, the binder resin contains an amorphous material of a low molecular weight component having a weight average molecular weight of 300 or more and less than 1000 in the area ratio of 10 to 20% with respect to the total amount of the binder resin, and a content ratio of the mold release agent to the amorphous material of the low molecular weight component is in the range of 0.5 to 0.7.

2. The electrostatic charge image developing toner according to claim 1, wherein the binder resin contains a styrene-acrylic resin.

3. The electrostatic charge image developing toner according to claim 1, wherein the mold release agent is an ester wax.

4. A method for producing the electrostatic charge image developing toner according to claim 1, comprising the step of producing the toner base particles by an emulsion aggregation method having at least an aging step.

5. The method for producing the electrostatic charge image developing toner according to claim 4, wherein the aging step is carried out in the range of −5 to 15° C. of a melting point of the mold release agent.

6. A method for forming an electrophotographic image comprising the steps of: a charging step of an image carrier, an electrostatic latent image forming step, an electrostatic latent image developing step, a toner image transferring step, a toner image fixing step and a cleaning step, wherein the method uses the electrostatic charge image developing toner according to claim 1.

* * * * *